United States Patent [19]

Miyamori et al.

[11] Patent Number: 5,524,259
[45] Date of Patent: Jun. 4, 1996

[54] PROCESSOR SYSTEM HAVING AN EXTERNAL ARITHMETIC DEVICE FOR HIGH SPEED EXECUTION OF COMPUTATION OF DATA

[75] Inventors: Takashi Miyamori, Tokyo; Miho Koga, Kanagawa-ken, both of Japan

[73] Assignee: Kabushiki Kaisha Toshiba, Kawasaki, Japan

[21] Appl. No.: 53,565

[22] Filed: Apr. 28, 1993

[30] Foreign Application Priority Data

Apr. 28, 1992 [JP] Japan .................. 4-109770
Apr. 28, 1992 [JP] Japan .................. 4-109771

[51] Int. Cl.$^6$ .................. G06F 13/16; G06F 13/36; G06F 13/40
[52] U.S. Cl. .................. 395/800; 364/239; 364/239.7; 364/240.5; 364/240; 364/240.7; 364/242.92; 364/DIG. 1; 364/DIG. 2; 395/250
[58] Field of Search .................. 395/800, 250, 395/275, 375, 575, 500, 200, 325, 733, 775, 421.08, 879, 550, 484; 364/DIG. 1, DIG. 2, 728.01, 724.12, 736, 726, 748, 745, 754, 724.12, 755, 756

[56] References Cited

U.S. PATENT DOCUMENTS

| 4,811,268 | 3/1989 | Nishitani et al. | 364/745 |
| 4,937,774 | 6/1990 | Malinowski | 364/724.12 |
| 4,945,506 | 7/1990 | Baji et al. | 364/736 |
| 5,068,819 | 11/1991 | Misra et al. | 364/736 |
| 5,179,530 | 1/1993 | Genusov et al. | 364/726 |
| 5,195,050 | 3/1993 | Hsu et al. | 364/728.01 |

Primary Examiner—Daniel H. Pan
Attorney, Agent, or Firm—Foley & Lardner

[57] ABSTRACT

A processor system has a processor for outputting an instruction including a first data to be used for arithmetic process, a multiplier for executing arithmetic operation including a first memory for storing the instruction output from the processor, a second memory for storing second data selected based on the instruction, and an arithmetic circuit for executing arithmetic operation between the first data and the second data, an address bus for connecting the processor and the multiplier, a data bus for transferring the second data and arithmetic result obtained by the arithmetic circuit. The multiplier is capable of executing the arithmetic operation between the second data items or between the first data and the second data, the arithmetic result is output to the second memory or the data bus under the control of the instruction.

2 Claims, 16 Drawing Sheets

| SELECTION FIELD | OP.CODE | FIRST SOURCE OPERAND (SRC 1) | |

SECOND SOURCE OPERAND (SRC 2) /DESTINATION FIELD

13

| R 0 | R 1 |
|-----|-----|
| R 2 | R 3 |
| R 4 | R 5 |
| ⋮ | ⋮ |
| R 30 | R 31 |

| A00 | A01 | A02 | A03 | A04 | | | | | | | | A11 | A12 | | | | | | A20 | A21 | | | | | | A29 |
|---|---|---|---|---|---|---|---|---|---|---|---|---|---|---|---|---|---|---|---|---|---|---|---|---|---|---|
| 1 | IRND | IYM | IYM | 0 | 0 | 0 | 0 | 0 | 0 | 0 | | | RADRH | | | | | | | RADRL | | | | | | |

PROCESSOR SYSTEM HAVING AN EXTERNAL ARITHMETIC DEVICE FOR HIGH SPEED EXECUTION OF COMPUTATION OF DATA

BACKGROUND OF THE INVENTION

1. Field of the Invention

The present invention relates to a processor system, and, in particular, to a processor system for high speed execution of computations of data obtained from a microprocessor.

2. Description of the Prior Art

FIG. 1 illustrates a processor system 100 using a conventional arithmetic device 11 or a computing device. The arithmetic device 11 comprises an instruction register 12, an internal register 13, and an arithmetic unit 14. Specification for an operation to the arithmetic device 11 is input to the instruction register 12 from a processor 10 through an address bus 15.

FIG. 2 shows the configuration of an item of address data (hereinafter referred to as "address") which is transferred through the address bus 15.

The arithmetic device 11 is addressed with a predetermined address. The high order bits of the address are used as a selection field. The lower bits of the address are an operation code specifying the operations of the arithmetic device 11, and a first source operand (SRC1) together with a second source operand (SRC2)/destination field, specifying two operand addresses.

FIG. 3 shows the configuration of the internal register 13. The internal register 13 is made up from 16-bit registers of 32 items (R0 to R31). It can be used as a 32-bit register by combination of a pair of the 16-bit registers.

The internal register 13 outputs data to the arithmetic unit 14 and receives computed results from the arithmetic unit 14 according to the addresses specified by the two fields SRC1 and SRC2 in the instruction registers 12.

The arithmetic device 11 performs a special operation when the register R0 is designated in the first source operand SRC1. When the register R0 is specified by the source operand SRC1, in a load operation to the internal register 13, the data on the data bus 16 is input to a register in the internal register 13 specified by the SRC2/destination field. In a store operation, the content of the register in the internal register 13 specified by the SRC2/destination field is output to the data bus 16.

FIG. 4 is a timing chart for the case where the multiplication process between value loaded into the internal register 13 in the arithmetic device 11 and immediate value as multiplication data provided from the data bus 16.

When an operation code for the load operation, the register R1 as a destination, and the register R0 for first source operand SRC1 are set in the instruction register 12 to set a first source operand into the register R1 in the arithmetic device 11, the value output on the data bus 16 is stored in the register R1 (see "bus cycle 1" shown in FIG. 4).

When the immediate data is used as the second source operand SRC2, a code is specified which shows a multiplication process in tile operation code, the register R0 is set in the SRC1, and the register R2 is set in the SRC2/destination. Accordingly, the value stored in the register R1 by the bus cycle 1 and the immediate value supplied from the data bus 16 are input to the arithmetic unit 14 and multiplied together. The computed result is stored in the register R1 (see "bus cycle 2" shown, in FIG. 4).

Next, in the bus cycle 3, when the register R0 is set in the first source operand SRC1 and the register R1 is set in the second source operand SRC2/destination, the value from the register R1 is output to the data bus 16.

The above-mentioned calculations are performed as three "mov" instructions from the processor 10.

The three "mov" instructions are shown as follows:

mov r1, @ load mov r2, @ mul mov @ store, r3 where mov instruction has a first operand as a source and a second operand as a destination, and is an instruction to transmit data. The characters "r1", "r2", and "r3" indicate the internal registers in the processor 10. Also, "@ load" indicates an operation for loading the register R1 of the arithmetic device 11, "@ mul" indicates an operation for multiplying the contents of the register R1 to the immediate value, and "@ store" indicates an address specifying an operation for reading out the result of the multiplication from the register R1.

However, as shown in FIG. 4, when the immediate value is used as the operand, the conventional arithmetic device 11 uses the data bus 16 for both of writing of the operand and of reading of the result of the multiplication process through the data bus 16.

Accordingly, one bus cycle is required for each of the write operation of operand and the read operation of arithmetic result.

As outlined above, the conventional arithmetic device 11 and the processor system 100 using the conventional arithmetic device 11 have the drawback that the execution time for computation using the arithmetic device 11 is long.

Next, another example of a processor system according to prior art will be described.

Conventionally, there have been cases where a computing element is connected to a bus of a professor to improve the performance of a processor system.

For example, when the processor does not have a built-in multiplier, there have been cases where a multiplier is set on the bus of the processor so that multiplication is carried out at high speed. In a processor without a built-in multiplier, the multiplication is carried out as repeated additions. In this case, for a 16-bit multiplier it is necessary to perform a maximum of 16 additions. When one clock cycle is required for the addition of one bit, 16 clock cycles are required for the addition. Fpr example, when utilizing a multiplier for input control or the like, the number of multiplications is high so that high speed multiplication is necessary.

FIG. 5 is an example of a processor system with a conventional external computing circuit. An arithmetic element is a multiplier 120. The processor system comprises a processor 100, a bus controller 11, the multiplier 120, a source register 130, a source register 140, and a buffer 180. The processor 100 is operated synchronously with a basic clock cycle BCLK and a double-frequency clock cycle CLK. Hereinafter, the term "clock cycle" refers merely to one cycle of the basic clock cycle BCLK. Data for input to the multiplier 120 is obtained from the source registers 130 and 140. The results of multiplications are output to a data bus via the buffer 150.

In the conventional example shown in FIG. 5 multiplication source data is written into the source register 130 and the source register 140 during a write bus cycle of the processor 100. Then, the results of multiplication of the multiplier 120 is transferred to the processor 100 in a read bus cycle of the processor 100.

The source registers 130, 140, and the buffer 150 are designated by addresses, respectively. Accordingly, the bus controller 110 outputs control signals SW1, SW2, and MOE to the source registers 13 and 14 and the buffer 150 when the addresses on the address bus 501 provided by a bus cycle of the processor 10 are equal to that of the source registers 130 and 140 and the buffer 150.

In the source registers 130, 140 the data on the data bus is latched internally at the rising edge of the control signals SW1 and SW2 respectively and is provided to the multiplier.

In addition, the buffer 150 outputs the various multiplied results output from the multiplier on the data bus when the control signal M0E is active (low level).

FIG. 6 is a timing chart for multiplication on the conventional processor system illustrated in FIG. 5. The processor 100 outputs an address specifying the source register 130 on the address bus at a clock cycle 1, which is a write bus cycle, and outputs data set in the source register 130 on the data bus.

The bus controller 110 outputs the rising edge of the control signal SW1 to the source register 130 at suitable timing.

At the rising edge, the source register 130 outputs this data to the multiplier 120. At a clock cycle 2 other multiplied data is set in the source register 140 in the same manner.

At a clock cycle 3, which is a read bus cycle, the processor 100 outputs the address of the buffer 150 to the address bus 501. The bus controller 110 activates the control signal MOE. The buffer 150 outputs the output from the multiplier 120 on the data bus and the processor 100 internally reads this result.

The time elapsed from the point where the data is set in the source registers 130, 140 until the processor 100 reads the result of the multiplication is part of one clock cycle, therefore the multiplier 120 should complete the multiplication within this time. In this manner, with the system shown in the conventional example of FIG. 5, a minimum time of three clock cycles is required to execute one multiplication. When an actual program is written for a multiplication process, three instructions of the following type are used. Three or more clock cycles are required the multiplication process to execute these three instructions.

mov r1, @ src 130—adr         (1)
    mov r2, @ src 140—adr         (2)
    mov @ mul—adr, r3             (3)

A mov instruction has a first operand as a source and a second operand as a destination, and is an instruction to transmit data. r1, r2, and r3 are internal registers of the processor. @ src130—adr, @ src140—adr, and @ mul—adr show the addresses for accessing the source register 130, the source register 140, and the buffer 150 respectively.

The instruction (1) Writes a value from the internal register r1 of the processor 100 to the source register 130. The instruction (2) writes a value from the internal register r2 of the processor 100 to the source register 140. The instruction (3) reads the result of multiplication to the internal register r3.

Eight clocks are required for executing three instructions (1), (2), and (3) when the number of actual execution clocks which are required for instructions (1) and (2) which execute the write bus cycle is two.

In this manner, even though the multiplication speed of the multiplier 120 is only one clock cycle, it is at high speed, the instructions for setting the data and reading out the multiplication result are separate. The process time is long, therefore time for at least eight clock cycles is necessary for one multiplication.

As outlined above, in a conventional processor system, separate instructions must be provided when setting data from the processor into the multiplier and reading out the multiplication results, so considerable time is required. This has the drawback that a high speed process cannot be provided.

SUMMARY OF THE INVENTION

Accordingly, an object of the present invention is to provide, with due consideration to the drawbacks of such conventional systems, a shortening of the time for execution of computations by outputting an immediate value to an address bus using one part of an address bus as a field for the immediate value, inputting operand data from the address bus and reading out a computed result from a data bus, so that it is possible to make the address bus. Accordingly, it is possible to output data to the data bus in one bus cycle. As a result, the execution time for computation is short.

Another object of the present invention is, with due consideration to the drawbacks of such conventional devices, to provide a processor system to reduce the overhead about data transmission between a processor and an arithmetic unit by supplying data read from memory to a multiplier directly not through a data bus.

A further object of the present invention is to improve performance by shortening the time for executing instructions by making multiplication possible by short instructions, and to reduce the volume of program memory by reducing the size of the program code.

A processor system according to a preferred embodiment of the present invention comprises:
- a processor for outputting an instruction including a first data to be used for arithmetic process;
- arithmetic means for executing arithmetic operation comprising:
  - first memory means for storing the instruction output from the processor;
  - second memory means for storing second data selected based on the instruction; and
  - an arithmetic circuit for executing arithmetic operation between the first data and the second data;
- an address bus for connecting the processor and the arithmetic means;
- a data bus for transferring the second data and arithmetic result obtained by the arithmetic circuit;
- wherein the arithmetic means is capable of executing the arithmetic operation between the second data items or between the first data and the second data, the arithmetic result is output to the second memory means or the data bus under the control of the instruction.

A processor system according to another preferred embodiment of the present invention, comprises:
- a processor for outputting an instruction including a first data to be used for arithmetic process;
- memory means for storing second data to be used for arithmetic operation, and for outputting the second data based on the instruction;
- arithmetic means for executing the arithmetic operation between the data items;

an address bus and a data bus for connecting the processor, the memory means, and the arithmetic means;

a dedicated bus for connecting between the memory means and the arithmetic means to transfer the second data between them, wherein the arithmetic means is capable of executing the arithmetic operation between the second data items or between the first data and the second data, the arithmetic result is output to the data bus under the control of the instruction based on the instruction.

A processor system according to another preferred embodiment of the present invention, comprises:

a processor for outputting an instruction including a first data to be used for arithmetic process;

memory means for storing second data to be used for arithmetic operation;

control means for controlling input/output operation of the memory means under the control of the instruction from the processor;

arithmetic means for executing the arithmetic operation between the data items transferred based on the control of the control means;

an address bus and a data bus for connecting the processor, the memory means, the control means, and the arithmetic means;

a dedicated bus for connecting between the memory means and the arithmetic means to transfer the second data between them, wherein the instruction is transferred from the processor to the control means; through the address bus, the arithmetic result of the arithmetic means is transferred through the data bus, the arithmetic means is capable of executing the arithmetic operation between the second data items, or between the first data in the instruction and the second data under the control of the control means.

the arithmetic means is capable of executing the arithmetic operation between the second data items or between the first data and the second data, the arithmetic result is output to the data bus under the control of the instruction based, on the instruction.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Other features of this invention will become apparent in the course of the following description of preferred embodiments which are given for illustration of the invention and are not intended to be limiting thereof.

<First embodiment>

Figure 7:
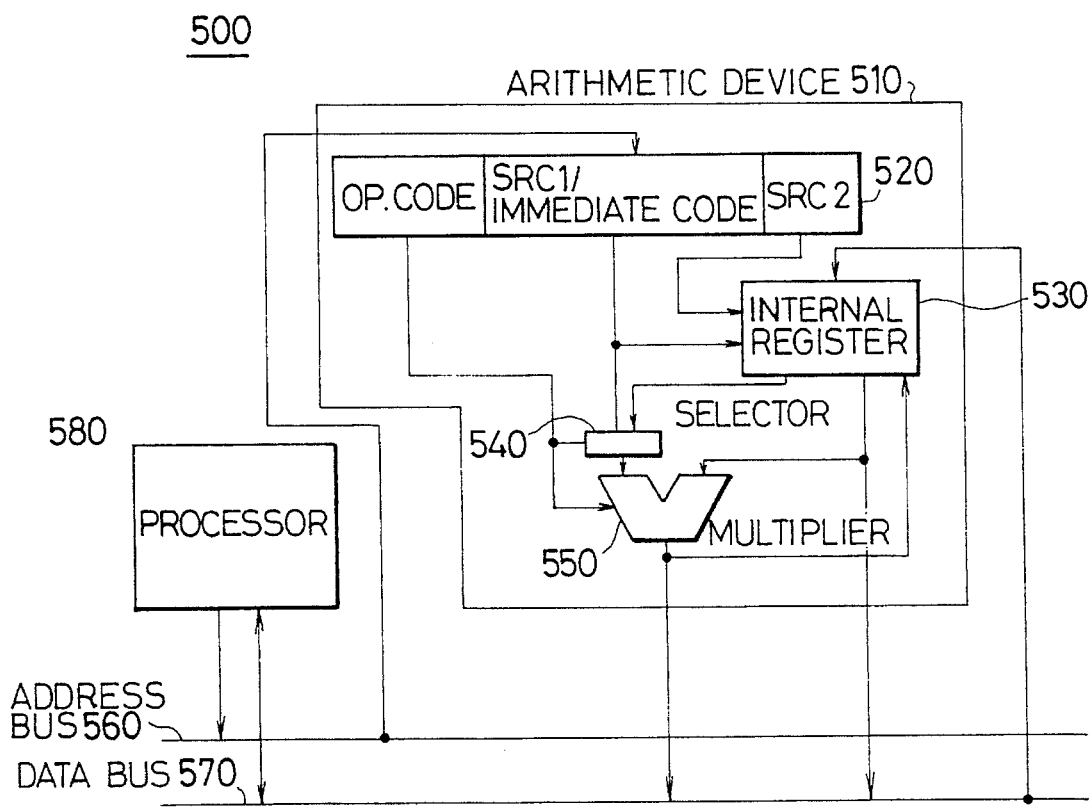
FIG. 7 is a configuration drawing of a circuit for a processor system of a first embodiment.

A first embodiment of the present invention will now be described with reference to FIGS. 7 and 8. FIG. 7 shows a configuration of a processor system according to the first embodiment of the present invention.

The processor system comprises a processor 580, arithmetic device 510, an address bus 560, and a data bus 570. The arithmetic device 510 comprises an instruction register 520, an internal register 530, a selector 540, and a multiplier 550 which performs a 16-bit×16-bit multiplication computation.

The arithmetic device 510 performs the multiplication computation according to an operation code and an operand address input to the instruction register 520 through the address bus 560.

The arithmetic device 510 is designated, in other word is addressed with a predetermined address, by means of an address on the address bus 560.

Figure 1:
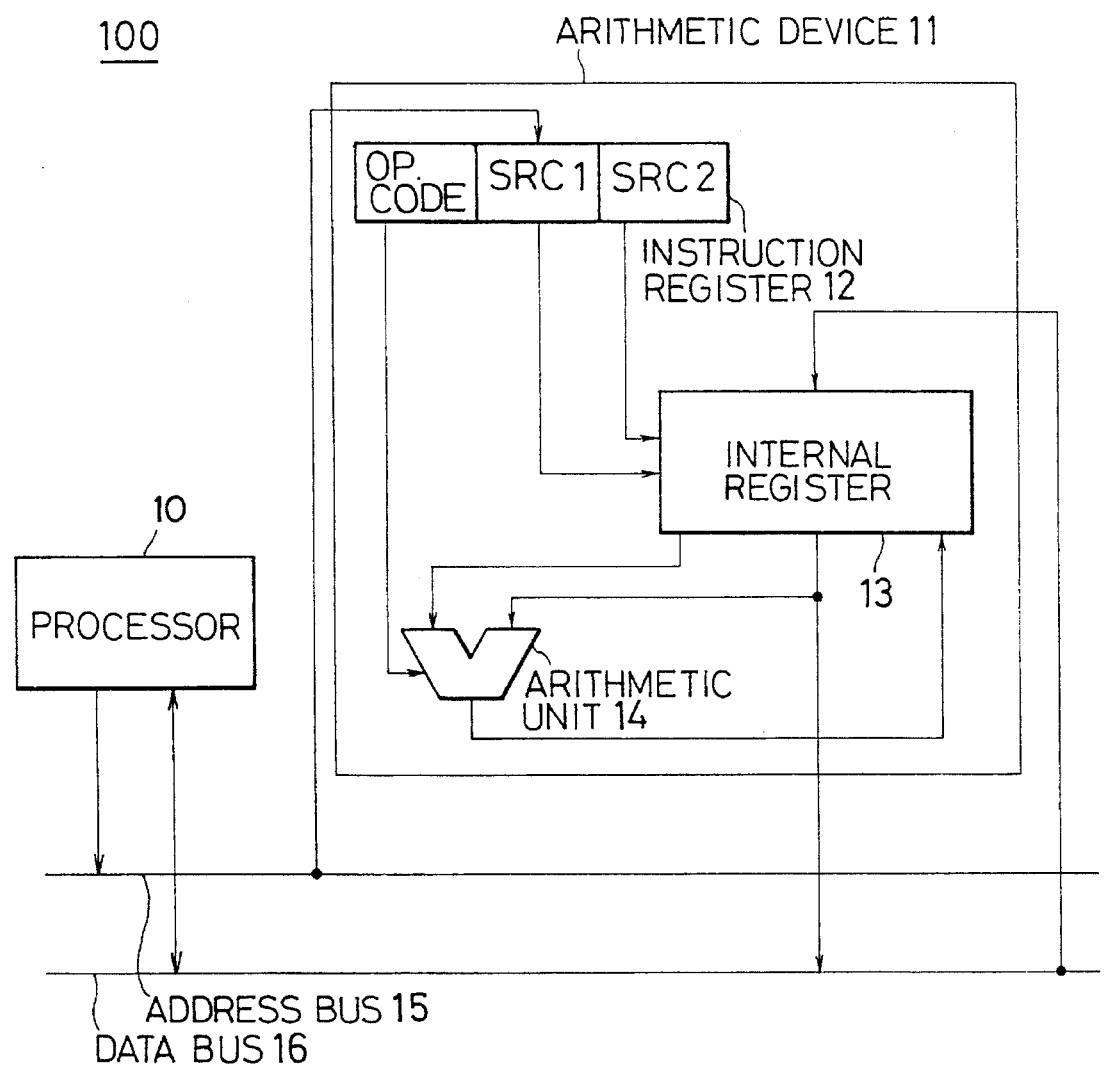
FIG. 1 is a configuration drawing of an arithmetic device in a conventional processor system.
Figures 2, 3:
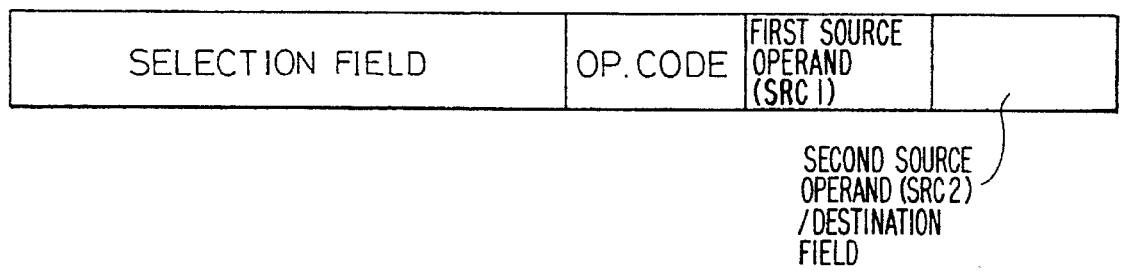
FIG. 2 is a drawing showing the structure of an address used in the conventional processor system illustrated in FIG. 1.
FIG. 3 is a drawing showing the structure of internal registers incorporated in the arithmetic device in the conventional processor system illustrated in FIG. 1.
Figure 4:
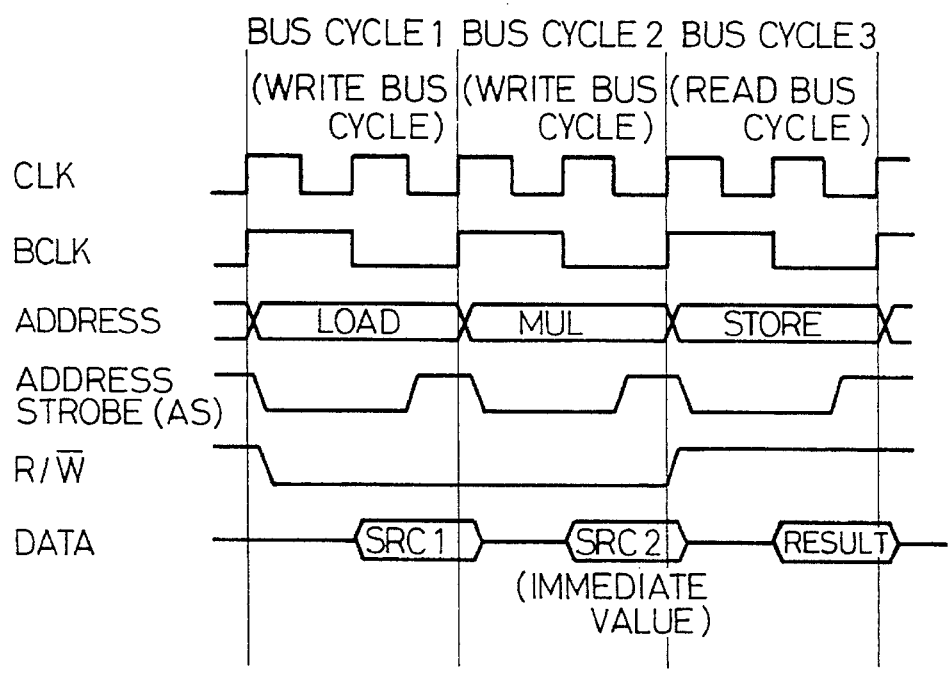
FIG. 4 is a timing chart explaining arithmetic operation in the arithmetic device shown in FIG. 1.
Figure 5:
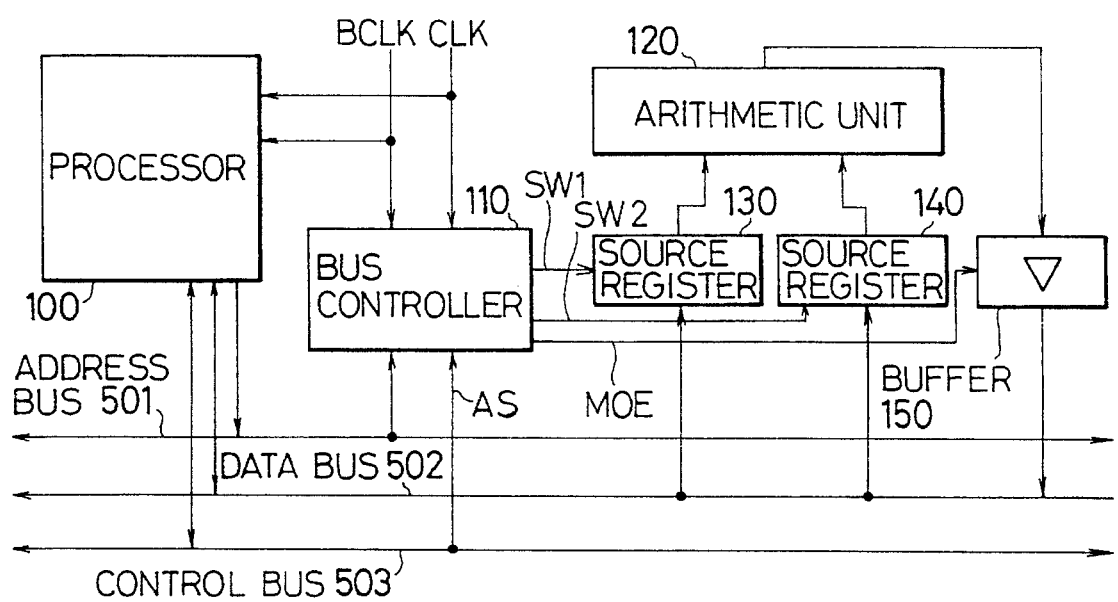
FIG. 5 is an example of a configuration drawing of a conventional system.
Figure 6:
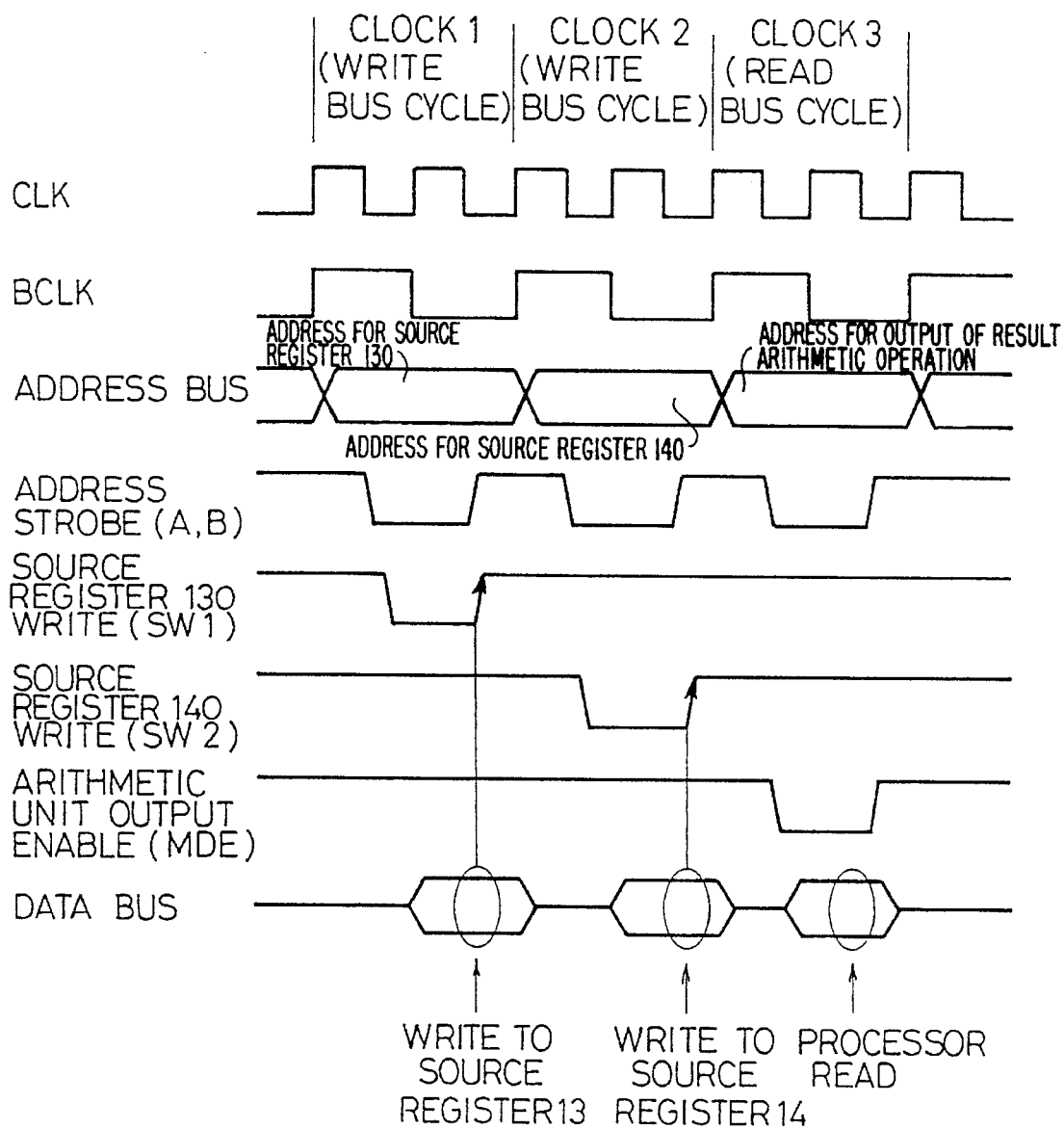
FIG. 6 is an example of a timing chart showing the operation of the conventional system illustrated in FIG. 5.
Figure 8:
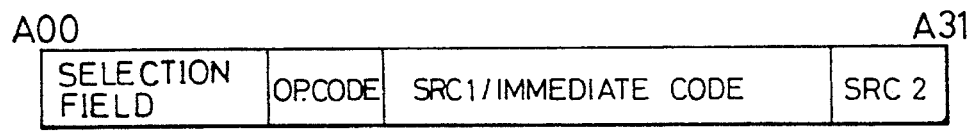
FIG. 8 is a drawing showing the structure of an address used in the processor system of the first embodiment illustrated in FIG. 7 according to the present invention.

FIG. 8 shows tile structure of the address. The address comprises a selection field, a field for an operation code (OP. CODE) specifying the operation of the arithmetic device 510, and an SRC1/immediate field and an SRC2/destination field. In addition, the arithmetic device 510 comprises a register such as that shown in FIG. 3 which data from a data bus 570 is input to the register R0 during a load operation. In the case of a store operation, data in the register R0 is output to the data bus 570. Within the address, the SRC1 field specifying the operand address, can be used as a field for the immediate data in addition to specifying the internal register 530. At this time, a value written into the immediate data field in the address is input as multiplication data into the arithmetic element 550. The operand code specifies whether this field is the register, or is the immediate value.

The multiplier 550 can input both data from the internal register 530 and from the immediate value which is set in the instruction register 520. The selector 540 selects which value is input by means of the operation code.

The result of the computation by the multiplier 550 can be stored in the internal register 530 but can also be output directly to the data bus 570. The operation code selects one of them.

In the processor system 500 of this embodiment, an multiplication operation between the value loaded into the register in the arithmetic device 510 and the immediate value input from the address bus 560 by the multiplier 550 is explained below.

Figure 9:
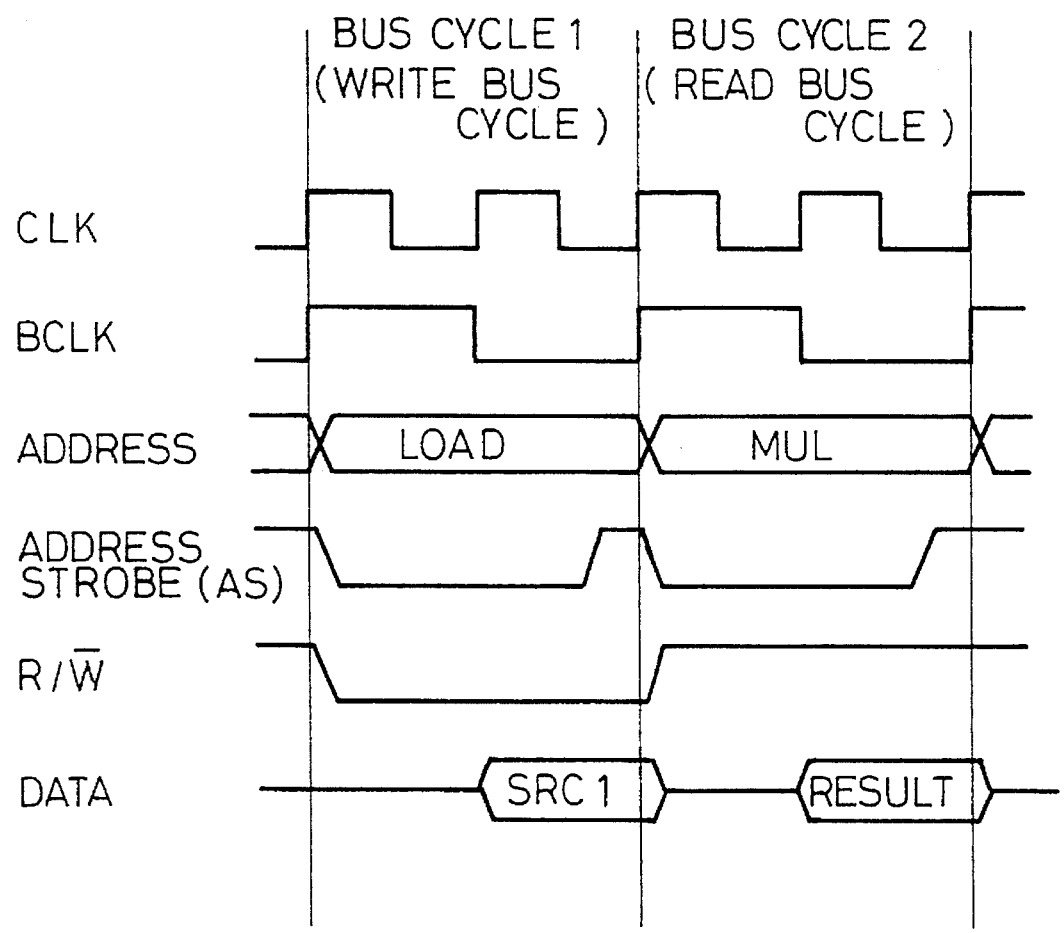
FIG. 9 is a timing chart explaining arithmetic operation in the arithmetic device of the processor system shown in FIG. 7 of the present invention.

FIG. 9 is a timing chart showing the operation of the arithmetic device 510. The multiplication operation by the arithmetic device 510 of the present embodiment can be completed in two bus cycles. In the bus cycle 1 (write bus cycle), a first source operand is loaded into the register R1 (see FIG. 3) in the internal register 530 in the arithmetic device 510. At this time, the address specifies the operation code for loading. The register R0 is specified as the SRC1, and the register R1 is specified as the SRC2/destination. The value output to the data bus 570 is loaded to the register R1 in the arithmetic device 510.

In the bus cycle 2, the loading process in which the second source operand is loaded to the multiplier 550, the multiplication process, and the readout operation for the result of the multiplication process are carried out.

The address specifies the multiplication of the immediate value as, the operation code with the bus multiplication data value set in the register in the cycle 1, and also specifies the output of the multiplication result to the data bus 570.

The operand address specifies the write-in of the immediate value computed in the SRC1/immediate field and also specifies R1 as the SRC2/destination.

At this time, the immediate value output to the address bus 560 and the value in the register R1 are input to the multiplier 550 and the multiplication is performed. The result is output to the data bus 570.

These operation are described with instructions used in the processor 580 as follows:

mov r1, @ load mov @ mul, r2 where, "r1" and "r2" designate internal register in the processor 580, "@load" designates the load instruction to the register R1 in the internal register 530 in the arithmetic device 510, and "@mul" is an address showing an instruction to multiply the immediate value and the data in the internal register.

Data in the register R1 in the processor 580 is loaded into the internal register R1 the arithmetic device 510 by the first instruction, and the immediate value output on the address bus 560 is multiplied to the data in the register R1 by of the second instruction.

The result, which is output on the data bus 570, is stored in the register r2 in the processor 580.

In the foregoing, the operation of the system related to the first embodiment of the present invention was explained. When this operation is carried out and data is input to the arithmetic device 510, because the arithmetic device 510 uses data, on the address bus 560 as input data (data or the immediate value specifying the internal register 880 of the arithmetic device S10), the data bus 570 is not used during execution of the data input to the arithmetic device S10.

Accordingly, it is possible to output data on the data bus 570 in one bus cycle. As a result, the execution time for the computation can be shortened.

<Second embodiment>

A second embodiment of the present invention will now be explained with reference to FIG. 10 to FIG. 15.

Figure 10:
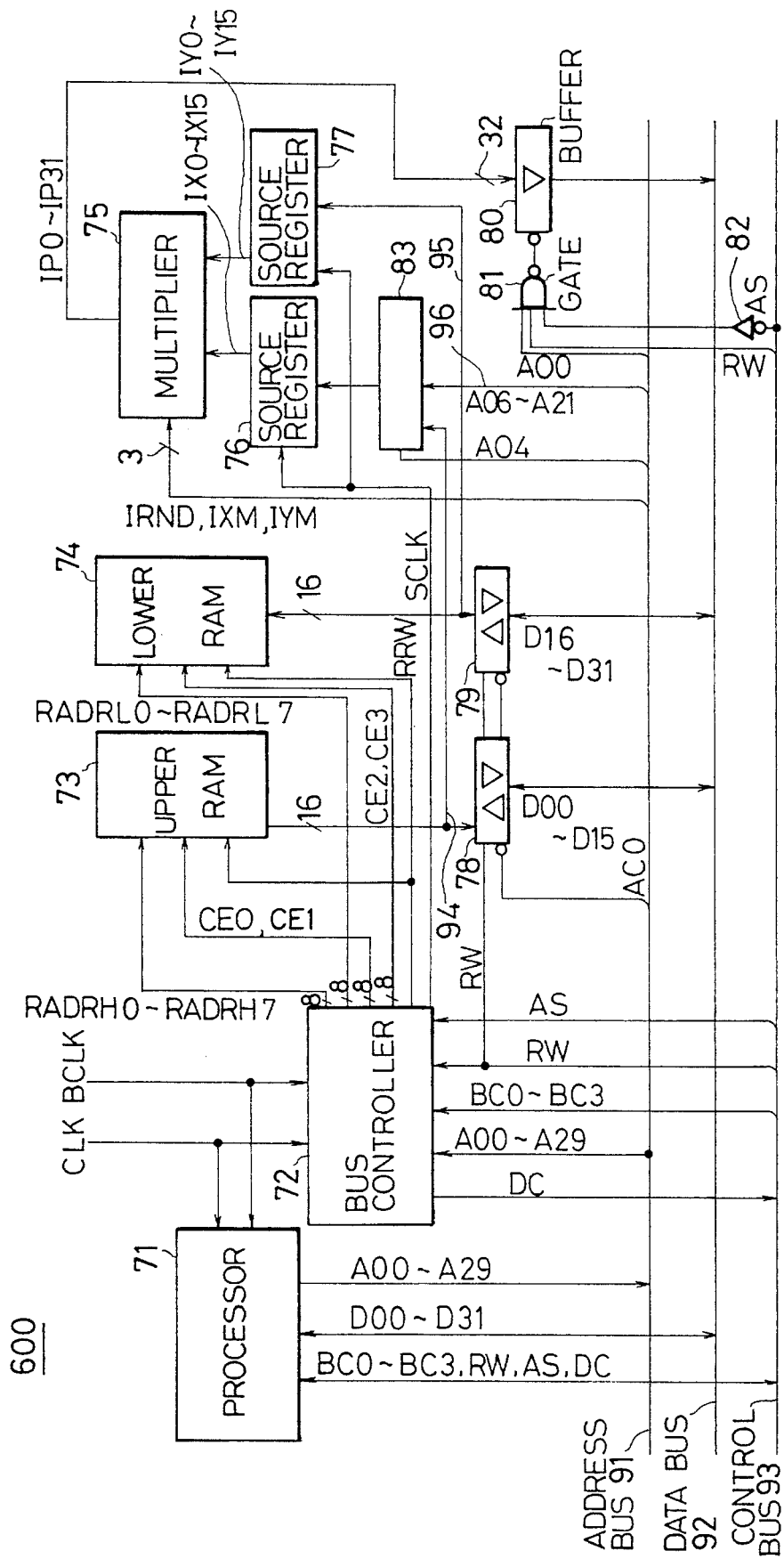
FIG. 10 is a configuration drawing of a circuit for a second embodiment of a system of the present invention.

FIG. 10 illustrates a processor system 600 as a second embodiment of the present invention.

The processor system 600 comprises a processor 71, a bus controller 72, a higher RAM 73, a lower RAM 74, a multiplier 75, a source register 76, a source register 77, a plurality of buffers 78, 79, 80, and a selector 83.

The processor 71 is operated synchronously with a basic clock cycle BCLK and a double-frequency clock cycle CLK. The processor outputs signals on signal lines connected to an address bus 91, a data bus 92, and a control bus 93. Address signal lines A00 to A29 are provided for outputting addresses which are accessed during execution of a bus cycle by the processor 71.

The address signal lines A00 to A29 are connected to the address bus 91. Data signal lines D00 to D31 are used for the reading and writing of data and are connected to the data bus 92. The processor 71 reads in data internally on the signal lines D00 to D31 during the read bus cycle, and outputs data to the signal lines D00 to D31 during the write bus cycle.

Byte control signal lines BC0 to BC3 are provided for activating ("0" means a low level) a byte position accessed by the processor 71 during bus cycle execution.

When BC0, BC1, BC2, and BC3 are activated, this indicates that D00 to D07, D08 to D15, D16 to D23, and D24 to D31 are accessed respectively. A read/write signal line RW is a signal line for showing that the bus cycle is reading or writing. The processor 71 sets an RW signal at 1 ("1" means a high level) during the read bus cycle and at 0 (the low level) during the write bus cycle DC signal line is activated ("0": the low level) by an external circuit (omitted from the drawing), the processor 71 completes the bus cycle at that clock cycle.

The byte control signal lines BC0 to BC3, the read/write signal line RW, the address strobe signal line AS, and the data transmission completed signal line DC are connected to the control bus 93.

The bus controller 72 is a circuit which accesses the higher RAM 73 and the lower RAM 74, and controls the write-in of data to the source registers 76, 77. In the bus controller 72, the address; signals A00 to A29, the byte control signals BC0 to BC3, the read/write signal RW, and the AS signal output from the processor 71 input via an address bus 91 and the control bus 93.

Address signals RADRH0 to RADRH7 and enable signals CE0, CE1 are output to the higher RAM 73, address signals RADRL0 to RADRL7 and enable signals CE2, CE3 are output to the lower RAM 74, and a read/write signal RRW is output to both RAMs 73, 74. In addition, an SCLK signal is output, showing the timing of a data latch for the source registers 76, 77 of the multiplier 75.

The higher RAM 73 and the lower RAM 74 are memories for storing data and programs. The higher RAM 73 is connected to the data buses lines D00 to D15 through the buffer 78.

The lower RAM is connected to the data buses D16 to D31 through the buffer 79. The words in the RAM are selected by using the address signal RADRH0–RADRH7 to RADRL0–RADRL7.

In the present invention art address is eight bits, therefore each RAM is 512 bytes. Also, it is possible to access in byte units by the enable signals CE0 to CE3. When CE0 to CE3 are activated (0: low level), data is read from the RAMs 73, 74, and written to the RAMs 73, 74. When the read/write signal RRW is 1 (high level), read access is possible and the RAMs 73, 74 output data.

When the read/write signal RRW is 0 (low level), write access is possible and the RAMs 73, 74 input data.

Sixteen-bit data signals IX0 to IX15 and IY0 to IY15 are input to the multiplier 75 and a 32-bit multiplication result IP0 to IP31 is output. IXM and IYM indicate whether IX0 to IX15 and IY0 to IY15 are integers with a sign (IXM, IYM=1) or not with a sign (IXM, IYM=0). These integers with a sign is shown in complement expression of 2.

If either of two input data IX0 to IX15 and IY0 to IY15 are integers with a sign (IXM=IYM=0), the multiplication result has not a sign.

If one of two input data IX0 to IX15 and IY0 to IY15 is an integer with a sign (IXM=IYM=0), the multiplication result has a sign.

IRND is a control signal specifying whether or not the high order 16 bits of the result computed in the multiplier 75 is rounded off. Only when IRND is 1, 1 is added to the uppermost bit of the low order 16 bits (IP15).

An example of this type of multiplier 75 which can be given is the hard macro cell MP16 of the Toshiba Standard Cell TC25SC Series.

Figure 11:
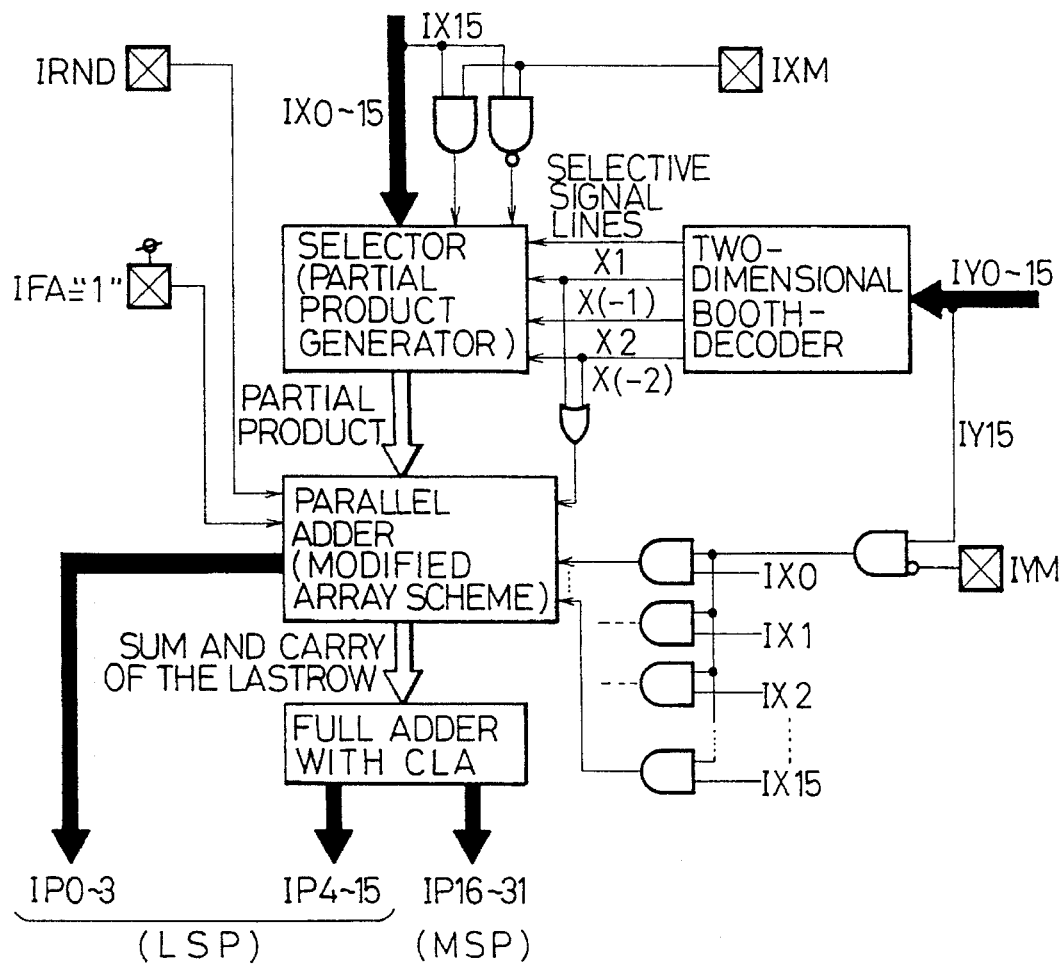
FIG. 11 is a configuration drawing of a multiplier used in the processor system shown in FIG. 10.

FIG. 11 is a circuit configuration diagram for the multiplier 75.

Next, the operation of the first embodiment of the processor system 600 shown in FIG. 10 will be explained.

The operation of the processor system 600 is divided into a RAM access operation and a multiplication operation.

(1) RAM access operation

In the RAM access operation the higher RAM 73 and the lower RAM 74 are normally accessed as RAMs of 32-bit width. The higher RAM 73 and the lower RAM 74 access the same address word.

Figure 12:
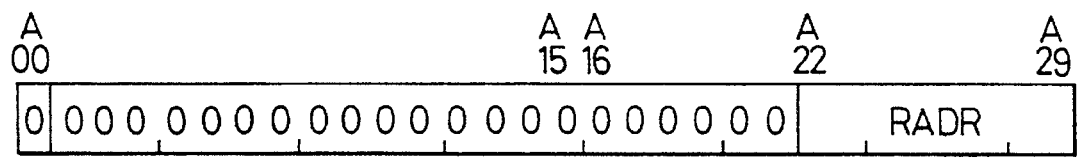
FIG. 12 is a drawing showing the structure of an address during access of a RAM which is a structural element of the second embodiment of the system of the present invention shown in FIG. 10.

An example of the address format is shown in FIG. 12.

A22 to A29 in RADR field are used commonly as RAM address RADRH0 to 7 and RADRL0 to 71 for the higher RAM 73 and the lower RAM 74 in common.

Also, in the example of the address format shown in FIG. 12 the high order addresses A00 to A21 are all "0". In the RAM access operation, the bus controller 72 activates the enable signals CE0 to CE3 corresponding to 73 the bus control signals BC0 to 3, and the higher RAM and the lower RAM 74 are accessed in byte units. During the read bus cycle with the RW signal set at "1", the RRW signal becomes "1" and data is read out from the RAMs 73, 74.

During the write bus cycle with the RW signal set at "0", the RRW signal becomes "0" and the data on a data bus 92 is written into the higher RAM 73 and the lower RAM 74. In the lower RAM access operation described above, the bus controller 72 outputs the addresses A22 to A29 to RADRH0 to RADRH7 and RADRL0 to RADRL7. The higher RAM 73 and the lower RAM 74 access the same address word.

In the RAM access state the two-way buffers 78, 79 are enabled by the A00 signal, and the direction is controlled by the RW signal. During the read bus cycle with the RW signal set at "1", output from the RAMs 73, 74 is output to the data bus 92.

During the write bus cycle with the RW signal set at "0", data output from the processor 71 on the data bus 92 is input to the RAM. Also, the gate 81 is disabled by the RW and AS signals, and the output from the multiplier 75 is not output to the data bus 92. Thus, in the RAM access operation, the higher order RAM 73 and the lower RAM 74 are accessed as 32 bit RAM.

Whether or not a multiplication operation is to be performed is judged from the address signal and the RW signal output by the processor 71. The multiplication operation is performed when the address signal A00 is "1" and the signal RW is "1" (read bus cycle).

In the multiplication operation, independent fields within the address output by the bus cycle become the addresses of the higher RAM 73 and the lower RAM 74 (RADRH0 to 7 and RADRL0 to 7). As a result, independent word data from the higher RAM 73 and the lower RAM 74 can be read and used as source data for the multiplication.

Figure 13:
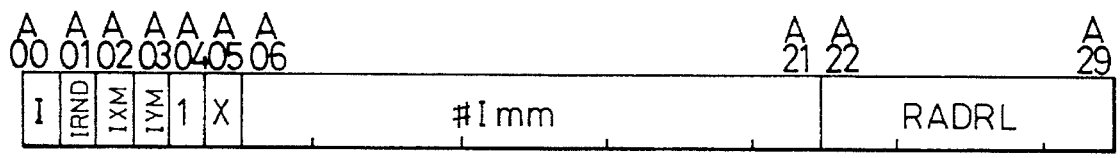
FIG. 13 is a drawing showing an address format in the case of the multiplication of an immediate value executed by the multiplier shown in FIG. 11.

FIG. 13 shows an example of the address format during the multiplication operation because A00 is "1". The signals A01, A02, and A03 are connected to IRD, IXM, and IYM respectively, specifying the multiplication mode.

The signal A04 indicates the source of the data input to the source register 76. When the signal A04 is "0", data is input to the source register 76 from the higher RAM 73 via a dedicated line 94.

When the signal A04 is "1", the immediate values of the addresses A06 to A21 are input to the source register 76 via the address bus 91 and a dedicated line 96. The addresses A22 to A29 are the addresses RADRL of the lower RAM 74, and the words in the lower RAM 74 specified by this field are read out.

The selector 83 is controlled by the signal A04. When A04 is "1" the values for A06 to A21, which is the data on the address bus 91, are output to the source register 76. When A04 is "0" the values in the higher RAM 73 are output to the source register 76.

In the multiplication operation, the data read out from the higher RAM 73, or the data on the signal lines A06 to A21, which is the data on the address bus 91, is stored directly in the source register 76. The data read out from the lower RAM 74 is stored directly in the source register 77, without passing through the data bus 92. Next, the multiplication results IP0 to 31 are output to the data bus 92 through the buffer 80.

At the next clock cycle the multiplication results on the data bus 92 are read by the processor 71.

In the multiplication operation, the bus controller 72 activates the signal lines CE0 to CE3, the control signal RRW becomes "1" to read out data from the higher RAMs 73 and the lower RAM 74. The bus controller 72 outputs the data on the signal lines A14 to A21 to the fields RADRH0 to RADR7, and outputs the data on the signal lines A22 to A29 to the fields RADRL0 to RADRL7.

The independent words in the higher RAM 73 and the lower RAM 74 is stored in the source register 77, and then these two data items are output to the multiplier 75. When the signal A04 is "1", the values of the signals A06 to A21 are stored in the source register 76. The two-way buffers 78, 79 are then in a disable state by the control signal A00 so that the output from the RAM 73, 74 is not output on the data bus 92. The gate 80 is enabled by the signals A00, RW, and AS, and the output from the multiplier 75 is output to the data bus 92.

Accordingly, the processor 71 is able to execute a 16-bit multiplication operation in one read bus cycle.

Figure 14:
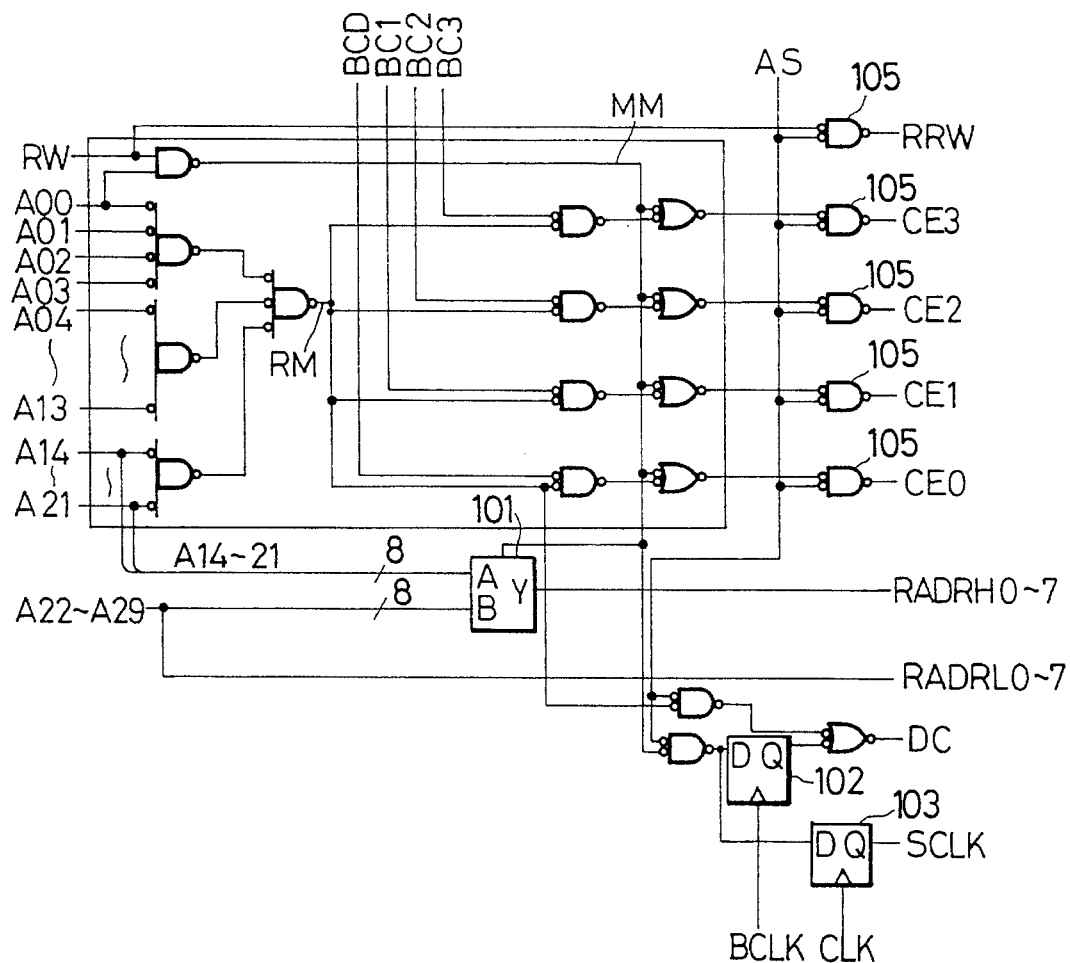
FIG. 14 is a configuration drawing of a bus controller used in the processor system shown in FIG. 10.

The bus controller 72 has a configuration as shown in FIG. 14 for executing the above-mentioned RAM access operation and multiplication operation.

The read write signal (RRW) to the RAM is 0 (0: low level) while the AS is activated in a write bus cycle.

The RAM is accessed and the signal line RM is activated (0:low level) when the signal lines A00 to A21 are all "0" ((low level).

When A00 is "1" and RW is "1", the multiplication operation is performed and a signal line MM is activated (0:low level). The signal lines CE0 to CE3 are activated while the signal line AS is activated (0:low level) in a RAM access operation and a multiplication operation.

During the multiplication operation with the MM signal activated, A14 to 21 are output to RADRH0 to RADRH7 by the selector 101. In addition, A22 to A29 are output to RADRL0 to RADRL7.

In the case of RAM access, a data transmission completed signal DC is returned to the processor 71 at the initial clock cycle in the bus cycle. Accordingly, the RAM access is executed in one clock cycle.

In the multiplication process, the data transmission completed signal DC is returned to the processor 71 one clock later by the bus controller 72 by means of a flip-flop 102.

The multiplication operation is completed in two clock cycles. During the multiplication operation, the signal SCLK outputs a rising edge to the SCLK line.

Figure 15:
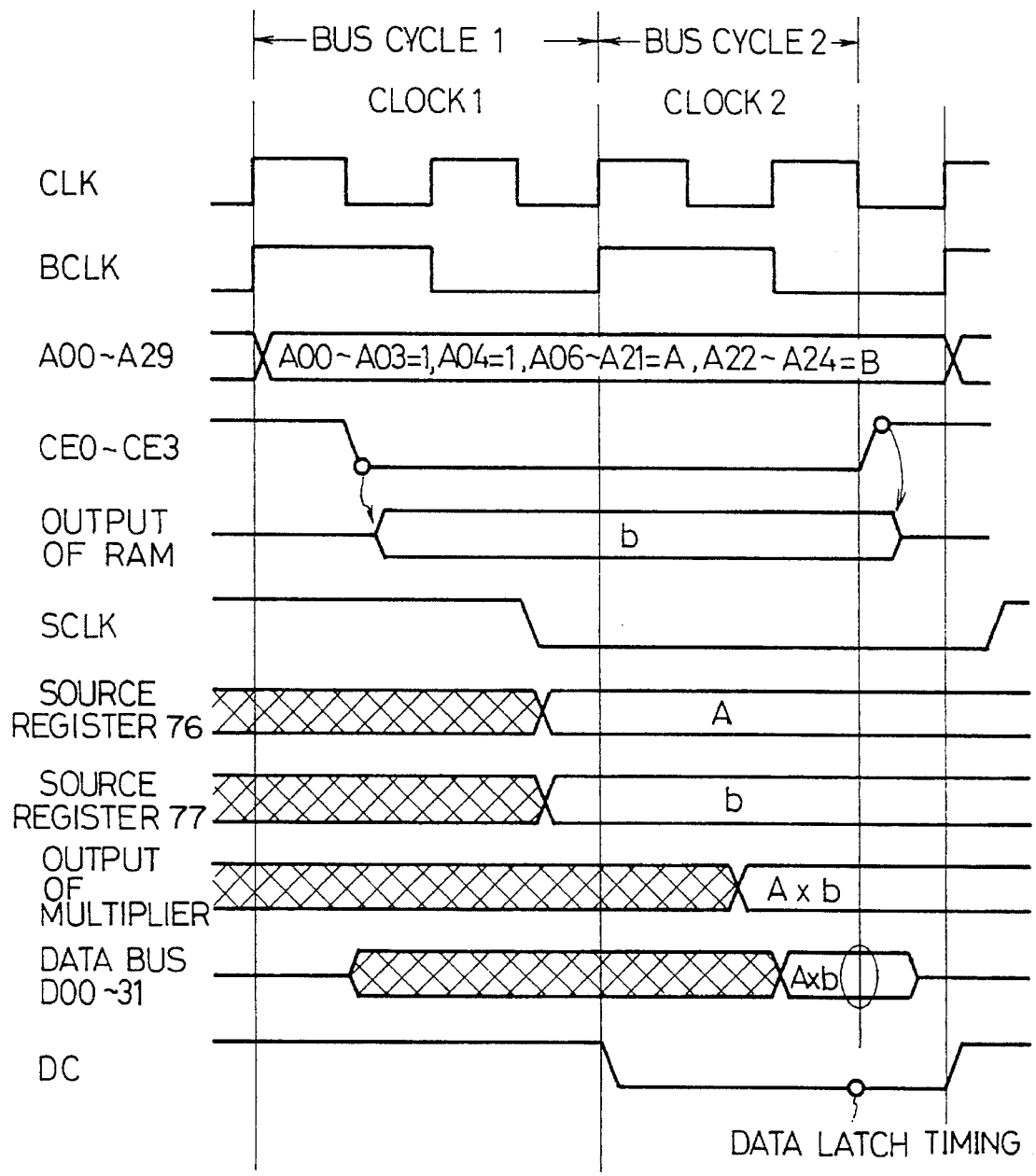
FIG. 15 is a chart showing the timing of the operation of the second embodiment of the system of the present invention shown in FIG. 10.

FIG. 15 is a timing chart for the multiplication of the immediate value.

The processor 71 outputs an address at a clock cycle 1 corresponding to FIG. 13. At this point, IRND=IXM=IYM=0, A06 to A21=A, and the RADRL field=B. The bus controller 72 sets the CE0 to CE3 to an activated state (low level) based on the address used for the multiplication process.

The value A is output as the immediate value to the source register 76 by the selector 83.

The address B are output to the lower RAM 74, the content b of the address B in the lower RAM 74 is output to the source register 77.

The outputs from the RAMs 73, 74 are latched in the source registers 76, 77 at the falling edge of the signal SCLK from the bus controller 72. The multiplication is executed using the latched data. The bus controller 72 activates the data transmission completed signal DC at the second clock cycle. The processor 71 reads the result of the multiplication which is output on the data bus 92 via the buffer 80.

Next, all example of programming when performing a multiplication with the processor system 600 of the present invention will be given. Because the multiplication is executed in one read bus cycle, an instruction "mov @mem-reg" for transmission from the memories 73, 74 to the registers 76, 77 or the like is used. In the instruction, the first operand designates a memory read access, so that when "@mem" is set by an address value for multiplication process shown in FIG. 13, the result of the multiplication can be stored in an internal register "reg" of the processor 71. For example, this is an instruction to cover the multiplication of a unit of unsigned 16-bit immediate data h'AAAA (where "h" indicates hexadecimal) and an unsigned word of data B at an address h'C2, with a multiplication result of 32 bits being stored in an internal register r0 in the processor.

The data word B is stored in the lower RAM 74 and the word address in the RAM 74 is h'30. Accordingly, the address of the multiplication operation shown in FIG. 13 becomes A01=A02=A03=0, A04=1, A06 to A21=#I mm =h'AAAA, and A22 to A29=h'30 from A00=1, IRND=IXM =IYM=0, and this gives the address h'8AAAA8c0. Accordingly, the product of the data h'AAAA and B can be obtained from mov @h'8AAAA8c0, r0 and is stored in the internal register r0.

If only the rounded result of the high order 16 bits is stored in rO, it is acceptable to read at a 16-bit width from the address A01=1 by means of/from IRND=1.

This instruction is as follows.

mov @h'cAAAA8c0.h, r0.h

The "h" after the operand shows that this is a 16-bit width data transmission. In addition, if the data is a signed integer, it may be read from an address in which IXM, IYM are set at "1".

The operation of the system 600 which is the second embodiment of the present invention has been explained above. Taking the structure of the system 500 which is the first embodiment of the present invention, the data bus 570 is unused during the input of data to the arithmetic device 510 because the data on the address bus 56 is used as one part of the input data.

Accordingly, in one bus cycle it is possible to output data on the data bus 570 as the multiplication result of the multiplication carried out by the multiplier 550. As a result, a computation on the arithmetic device is executed in a short time. In addition, the input data set in the arithmetic device can be directly transmitted from the RAM. Also, part of the data input to the arithmetic device 75 in the system 600 which is the second embodiment of the present invention is transmitted directly from the RAMs 73, 74, and another part (one operand) can be transmitted from the address bus 91. In this manner, it is possible for the processor to input data from the computation result in one bus cycle. When viewed from the processor 71, the computer device can be operated and the computation results input in the same manner as accessing the main memory and inputting data.

<Third embodiment>

A processor system as a third embodiment of the present invention will now be described below.

Figure 16:
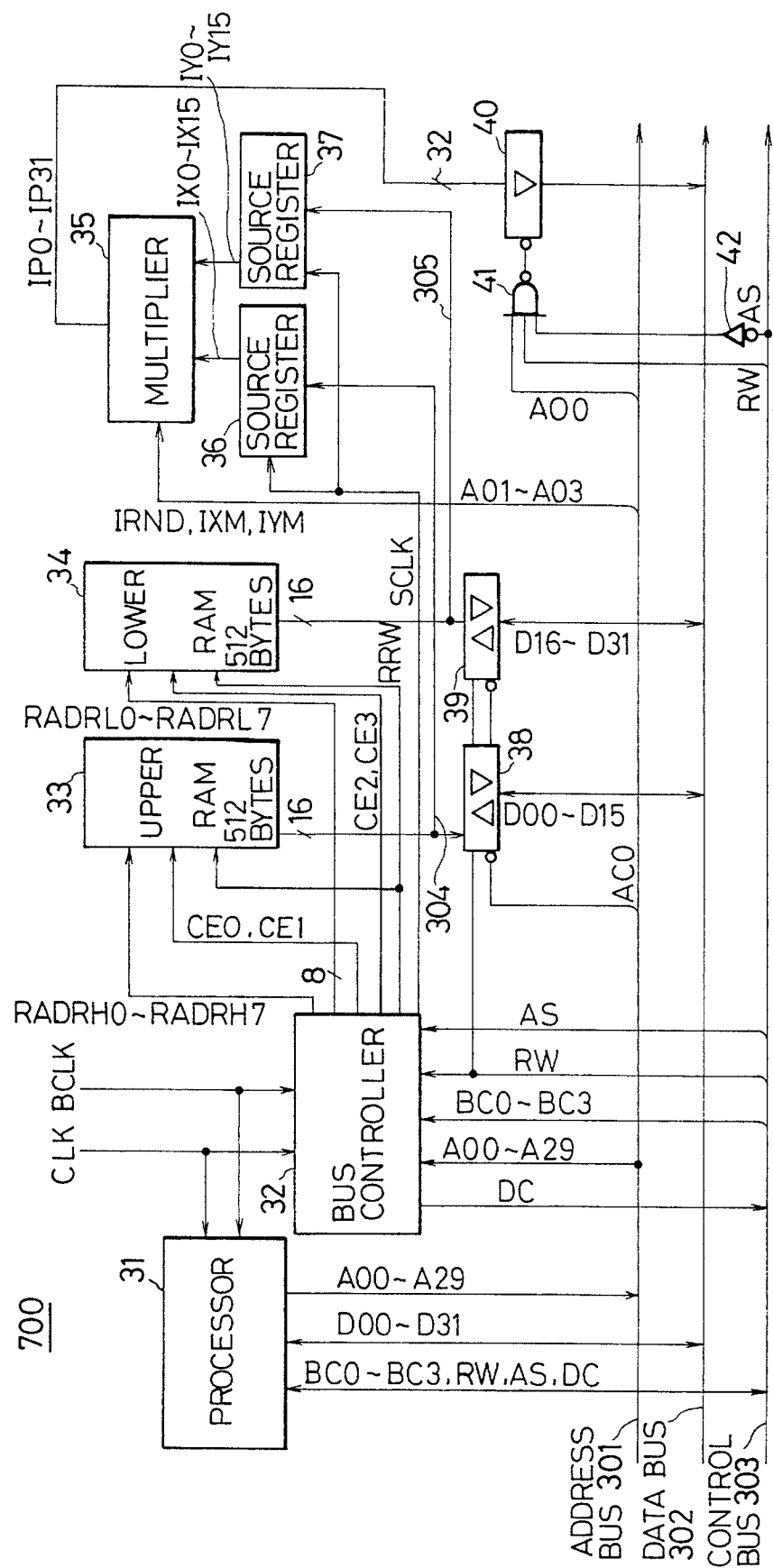
FIG. 16 is a configuration drawing of a circuit for a processor system containing a multiplier circuit for a third embodiment of the present invention.

FIG. 16 shows a configuration of the processor system 700 as the third embodiment of the present invention.

The processor system comprises a processor 31, a bus controller 32, a higher RAM 33, a lower RAM 34, a multiplier 35, a source register 36, a source register 37, a plurality of buffers 38, 39, 40, and a pair of gates 41, 42.

The processor 31 is operated synchronously with a basic clock cycle BCLK and a double-frequency clock cycle CLK. The processor signal lines are connected to an address bus 301, a data bus 302, and a control bus 303.

Access address is output on address signals A00 to A29 in address signal lines by the processor 31 during a bus cycle execution.

The address signal lines for the address signals A00 to A29 are connected to the address bus 801. Data signal D00 to D31 on data signal lines are used for the reading and writing of data and the data signal lines are connected to the data bus. The processor 31 reads in data internally on the signal lines D00 to D31 during the read bus cycle, and outputs data to the signal lines D00 to D31 during the write bus cycle.

Byte control signal BC0 to BC3 in the byte control signal lines are provided for activating (0:low level) a byte position accessed by the processor 31 during bus cycle execution.

When BC0, BC1, BC2, and BC3 are activated, this indicates that D00 to D07, D08 to D15, D16 to D23, and D24 to D31 are accessed respectively.

A read/write signal RW in a read write signal line is a signal for showing that the bus cycle is reading or writing. The processor 31 sets an RW signal at 1 (high level) during the read bus cycle and at 0 (low level) during the write bus cycle.

An address strobe signal AS in an address strobe signal line is set in an active state (0:low level) by the processor 31 during the bus cycle.

A data transmission completed signal DC in a data transmission completed signal line is a signal for controlling a completion of bus cycle.

When the DC signal is activated by an external circuit (0:low level), the processor 31 completes the bus cycle at that clock cycle.

The byte control signal lines BC0 to BC3, the read/write signal line RW, the address strobe signal line AS, and the data transmission completed signal line DC are connected to the control bus.

The bus controller 32 is a circuit which accesses the higher RAM 33 and the lower RAM 34, and controls the write-in operation of data to the source registers 36 and 37.

The bus controller 32 inputs the address signals A00 to A29, the byte control signals BC0 to BC3, the read/write signal RW, and the AS signal output by the processor 31 via an address bus 301 and a control bus 303. The bus controller 32 outputs address signals RADRH0 to RADRH7 and the enable signal CE0, CE1 to the higher RAM 33, and address signals RADRL0 to RADRL7 and enable signals CE2, CE3 are output together with a read/write signal RRW to the lower RAM 34.

In addition, an SCLK signal is output, showing the timing of a data latch for the source registers 36, 37 of the multiplier 35 by the bus controller 32.

The higher RAM 33 and the lower RAM 34 are memories for storing data and programs. The higher RAM 33 is connected to the data bus lines for the data bus signal D00 to D15 through the buffer 38.

The lower RAM 34 is connected to the data buses for the data bus signals D16 to D31 through the buffer 39. Each word in the RAMs is selected by the address signals RADRH0 to RADRH7 and RADRL0 to RADRLT. In the present invention an address is eight bits, namely eight number wires, Also, it is possible to access a byte unit by the enable signals CE0 to CE3. When the signals CE0 to CE3 are activated (0:low level), data is read from the RAMs, and written to the RAMs. When the read/write signal RRW is 1 (high level), read access is possible and the RAMs can output data. When the read/write signal RRW is 0 (low level), write access takes place and the RAMs output data.

Sixteen-bit data units IX0 to IX15 and IY0 to IY15 are input to the multiplier 35 and a 32-bit multiplication result IP0 to IP31 is output. IXM and IYM indicate whether IX0 to IX15 and IY0 to IY15 are signed integers (IXM, IYM=1), or unsigned integers (IXM, IYM=0). Coded integers take complement expression of 2. In the case of two items of input data, IX0 to IX15 and IY0 to IY15 with unsigned integers (IXM=IYM=0), the multiplication result becomes unsigned integer. On the other hand, In the case of one of two items of input data, IX0 to IX15 and IY0 to IY15 with unsigned integers (IXM=IYM=0), the multiplication result becomes a signed integer. IRND is a signal for indicating whether or not the multiplication result is rounded off.

Only when the signal IRND is 1, 1 is added to the uppermost bit of the low order 16 bits (IP15). An example of this type of multiplier which can be given is the hard macro cell MP16 of the Toshiba Standard Cell TC25SC Series (which is a name of data manual).

Figure 17:
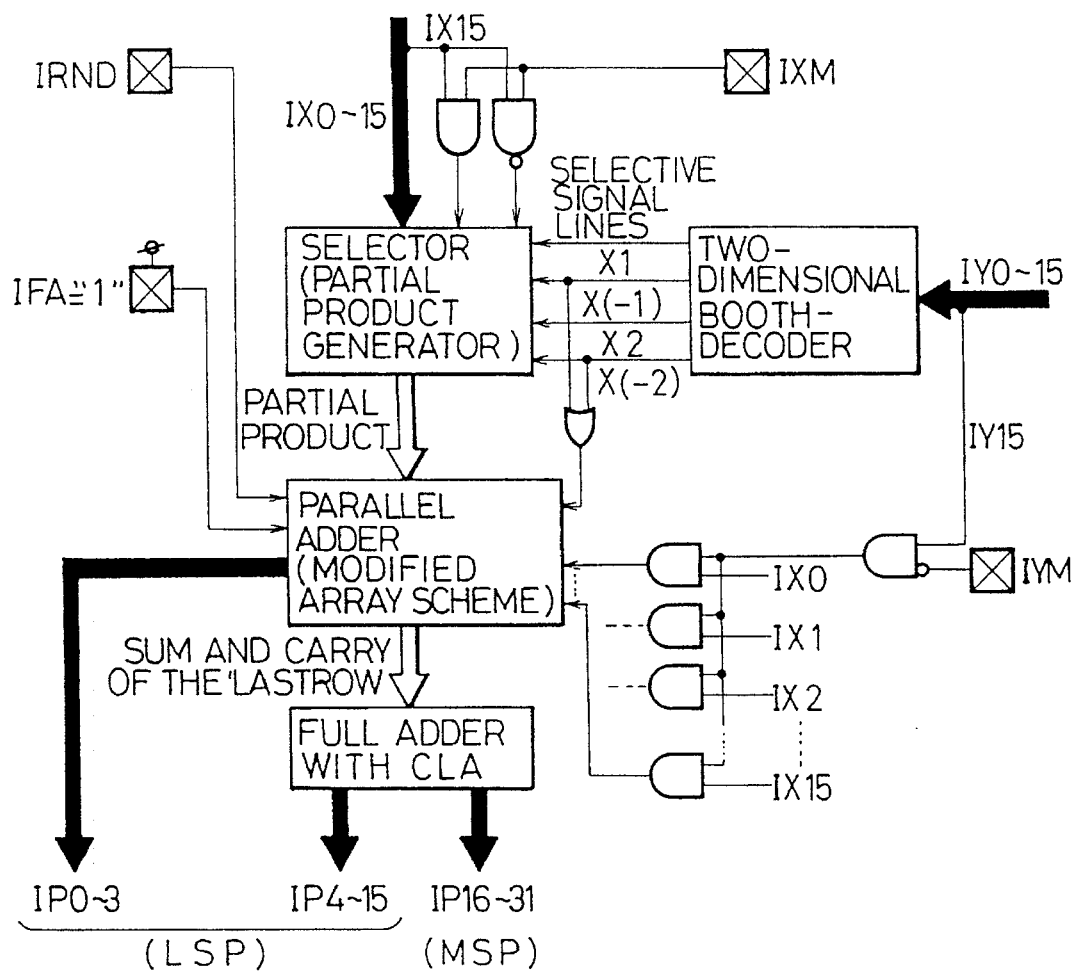
FIG. 17 is a configuration drawing of a circuit for a multiplication circuit shown in FIG. 16.

FIG. 17 is a circuit configuration diagram for this multiplier.

Next, the operation of the third embodiment of the processor system 700 shown in FIG. 16 will be explained.

The operation of the processor system 700 is divided into a RAM access operation and a multiplication operation.

(1) RAM access operation

Figure 18:
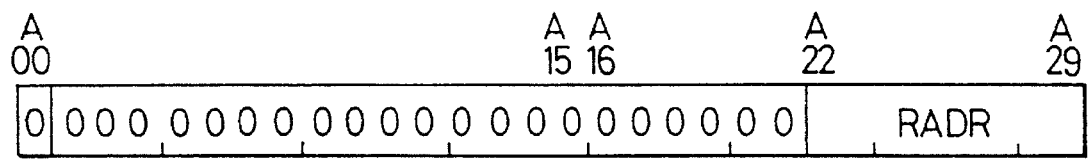
FIG. 18 is a drawing showing an address format used in the processor system of the third embodiment shown in FIG. 16.

In the RAM access operation the higher RAM 33 and the lower RAM 34 are normally accessed as RAMs of 32-bit width. The higher RAM 33 and the lower RAM 34 access the same address word. An example of the address format is shown in FIG. 18. RADR field A22 to A29 are used as RAM address for the higher RAM 33 and the lower RAM 34 commonly. Also, in the example of FIG. 18 the high order addresses A00 to A21 are all "0". In the RAM access operation, the bus controller 32 activates the enable signals CE0 to CE3 corresponding to the bus control signals BC0 to BC3, and the higher RAM 33 and the lower RAM 34 are accessed in byte units. During the read bus cycle with the RW signal set at "1", the RRW signal becomes "1" and data is read out from the RAMs 33, 34. During the write bus cycle with the RW signal set at "0", the RRW signal becomes "0" and the data on a data bus 302 is written into the higher RAM 33 and the lower RAM 34. The bus controller 32 outputs the addresses A22 to A29 to RADRH0 to RADRH7 and RADRL0 to RADRL7 to access same words in the higher RAM 33 and the lower RAM 34.

In the RAM access state, two way buffers 38, 39 are enabled by the A00 signal, and the direction is controlled by the value of the RW signal. During the read bus cycle with the RW signal set at "1", output from the RAM is output to the data bus 302.

During the write bus cycle with the RW signal set at "0", data output from the processor 31 on the data bus 302 is input to the RAM. Also, the gate 41 is disabled by the RW and AS signals, and the output from the multiplier 35 is not output to the data bus 302.

In this manner, the higher RAM 33 and the lower RAM 34 are accessed as a 32-bit RAM in the RAM access operation.

(2) Multiplier operation

In the multiplier operation, the data read out from the RAM 33 is stored directly in the source register 36, and the data from the lower RAM 34 is stored in the souce register 37, using a pair of dedicated lines 304, 305.

The multiplication results IP0 to IP31 are output on the data bus 302. The processor 31 writes in the multiplication results at the next clock cycle.

The multiplication operation is executed based on the values of the address signal and the RW signal output by the processor 31. The multiplication -operation takes place when the address A00 is "1", A04 to A13 are all "0", and RW is "1" (read bus cycle).

Figure 19:
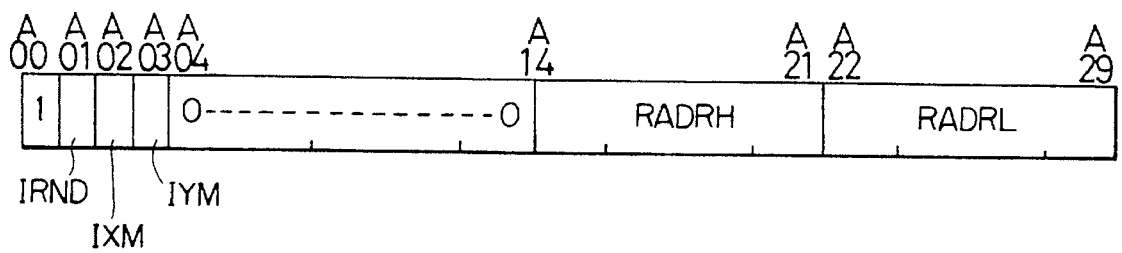
FIG. 19 is a drawing showing an address format used in the processor system of the third embodiment shown in FIG. 16.

In the multiplication operation, independent fields within the address which is output in the bus cycle are made the RAM address for the higher RAM 33 and the lower RAM 34 (RADRH0 to 7 and RADRL0 to 7). Independent word data from the higher RAM 33 and the lower RAM 34 is used as the source data For multiplication. An example of the addressing the multiplication operation is illustrated in FIG. 19. The address A00 is "1" and the addresses A04 to A13 are all "0", showing that this is a multiplication operation. The addresses line for the address signals A01, A02, and A03 are connected to the signal lines IRND, IXM, and IYM respectively, specifying the multiplication mode.

A14 to A21 are the addresses RADRH to the higher RAM 33. The words in the higher RAM 33 specified by this field are read out through a dedicated line 304.

A22 to A29 are the addresses RADRL to the lower RAM 34. The words in the lower RAM 34 specified by this field are read out through a dedicated line 305.

In the multiplication operation, the bus controller 32 activates the signals CE0 to CE3 and sets the signal RRW to "1", then data is read out of the RAMs 33, 34.

The bus controller 32 outputs A14 to A21 to RADRH0 to RADRH7, A22 to A29 to RADRL0 to RADRL7, then reads out independent words from the higher RAM 33 and the lower RAM 34. The data from the higher RAM is stored in the source register 36 and the data read out of the lower RAM 34 is stored in the source register 37, then output to the multiplier 35.

The two-way buffers 38, 39 are then disabled by the signal A00 so that the output from the RAMs 33, 34 is not output on the data bus 302. At this time the gate 41 is enabled by the signals A00, RW, and AS, and the output from the multiplier 35 is output to the data bus 302 via buffer 40.

Accordingly, the processor 31 is able to execute a 16-bit multiplication operation in one read bus cycle.

Figure 20:
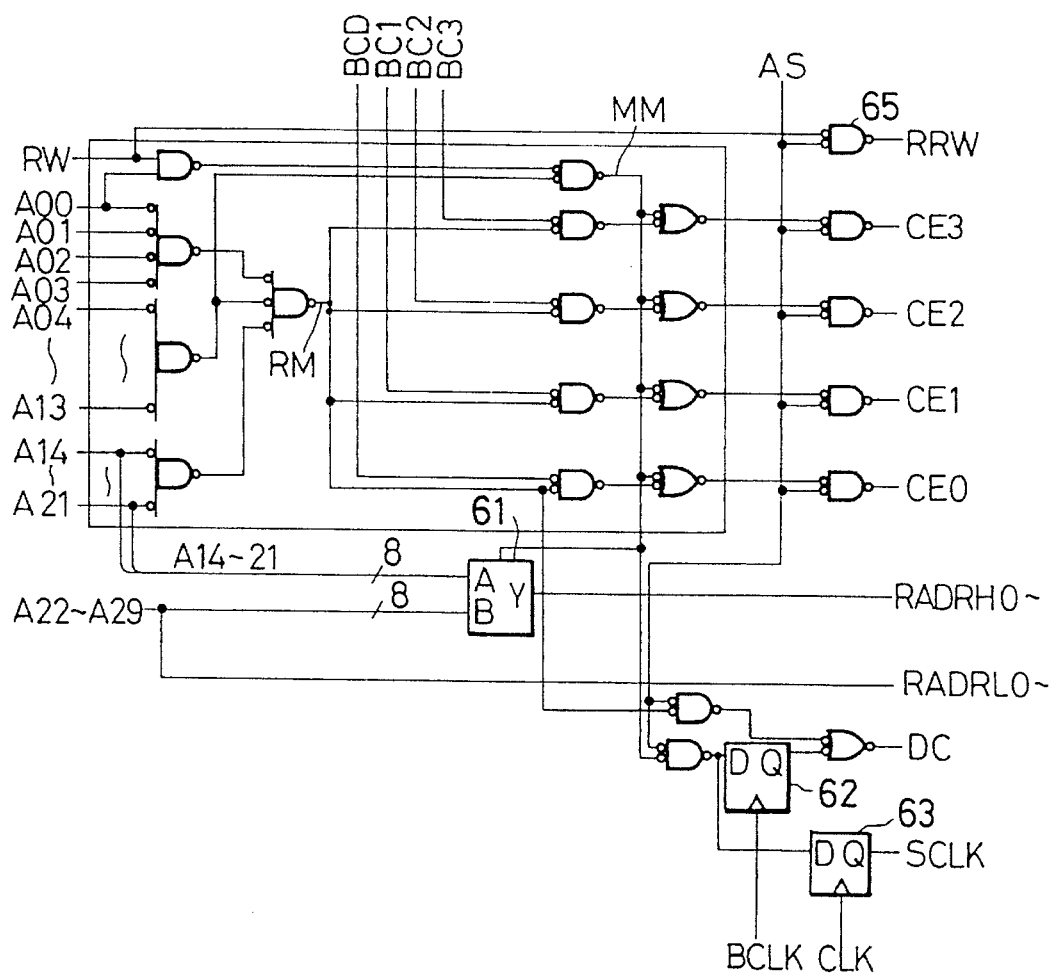
FIG. 20 is a configuration drawing of a circuit for a bus controller used in the system of the third embodiment of the present invention shown in FIG. 16.

The bus controller 32 has a configuration as shown in FIG. 20 for executing the above-mentioned RAM access operation and multiplication operation.

The read/write signal RRW for the RAMs 33, 34 is "0" (low level) only during a period when the signal line"1", A04 to A13 are all "0", and RW is "1", the multiplication operation is performed, and a signal line MM is activated (0:low level). The signal lines CE0 to CE3 are activated while the signal line AS is activated (0:low level) in a RAM access operation and a multiplication operation.

During the multiplication operation with the MM signal activated, A14 to 21 are output to RADRH0 to RADRH7. The signals A22 to A29 are output to RADRL0 to 7. In the case of RAM access, a data transmission completed signal DC is returned to the processor 31 at the initial clock cycle in the bus cycle. Accordingly, the RAM access is executed in one clock cycle. In the multiplication operation the bus controller 32 is delayed one clock cycle by means of a flip-flop, and a data transmission completed signal DC is returned to the processor 31 one clock later. The multiplication process is completed with two clock cycles. When the multiplication process is executed, the bus controller 32 outputs a rising edge to the SCLK line.

Figure 21:
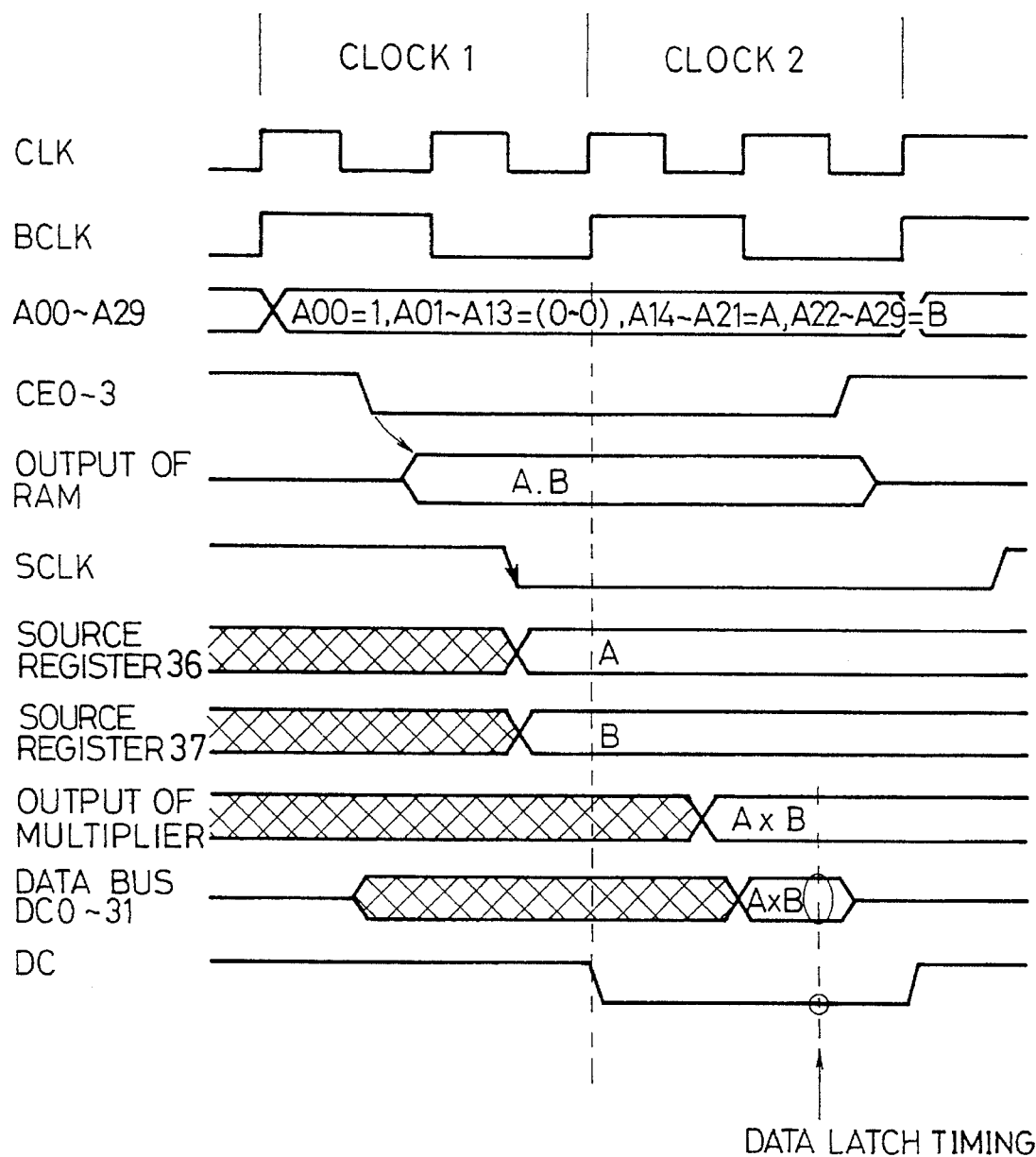
FIG. 21 is a timing chart showing the operation of the system of the third embodiment of the present invention shown in FIG. 16.

FIG. 21 is a timing chart for the multiplication operation.

The processor 31 outputs an address at a clock cycle 1. At this point, IRND=IXM=IYM=0, the RADRH field =A, and the RADRL field=B. The bus controller 32 recognizes the address of the multiplication operation and activates the signal lines CE0 to CE3 (0:low level). A is provided to the higher RAM 33, B is provided to the lower RAM 34, and the contents of these RAMs are output to the source registers 36, 37 respectively. The outputs from the RAMs 33, 34 are latched in the source registers 36, 37 at the falling edge of the signal SCLK from the bus controller 32. The multiplication is executed using the latched data. The bus controller 32 activates the data transmission completed signal DC at the second clock cycle. The processor 31 reads the multiplication result on the data bus 302 through the buffer 40. One clock cycle is required from the time the values are set in the source registers 36, 37 until the multiplication result is read out, the same as in the conventional example. Accordingly, the multiplier can be used at the same speed as a conventional multiplier. In this embodiment, one multiplication is performed in one read cycle, therefore can be executed in a minimum of two clock cycles.

Next, an example of programming when performing a multiplication with the processor system of the present invention will be given.

Because the multiplication is executed in one read bus cycle, a instruction "mov @mem, reg" for transmission from memory to a register or the like is used. Here, a first operand indicates a memory read access, and if "@mem" is taken as an address value for the multiplication operation shown in FIG. 8, the result of the multiplication can be stored in an internal register reg.

For example, an instruction is considered below. By this instruction, a multiplication operation between a unsigned 16 bit data word A of an address h'10 (where h' indicates hexadecimal) and a unsigned data word B is executed and a multiplication result of 32 bits is stored in an internal register r0 in tile processor 31.

The data word B is stored in the lower RAM 34 and the word address in the RAM 34 is h'30. Also, the data word A is stored in the higher RAM 33 and the word address in the RAM 33 is h'04. Accordingly, the address of the multiplication operation shown in FIG. 21 becomes A01=A02=A03=0, A04 to A13=0 to 0, A14 to A21=h'04, A22 to A29=h'30 from A00=1, IRND=IXM=IYM=0, and this gives the address h'800010c0. Accordingly, the product of the data words A and B is obtained from mov @h'800010c0, r0.h and is stored in the internal register r0.

If only the rounded result of the high order 16 bits is stored in r0, it is acceptable to read at a 16-bit width from the address A01=1 by IRND=1.

This instruction is as follows:

mov @h'c00010c0.h, r0.h

The "h" after the operand shows that this is a 16-bit width data. If the data is a signed integer, it may be read from an address in which IXM, IYM are set at "1".

A program of which the following is an example is considered to be an scaler product operation with the product of the data units A and B added to the internal register r0.

This can be provided by the following addition instruction.

add @h'800010c0, r0

In the addition instruction add, the value of the first operand is added to the second operand.

Accordingly, with the above-mentioned instruction, the product of the data units A and B read from the address h'800010c0 is added to the register r0. The scaler product operation is an operation which appears very frequently in the application of a signal process and the like. With the processor system of the present invention, this operation can tie easily carried out with an addition instruction.

<Fourth embodiment>

Figures 22, 23:
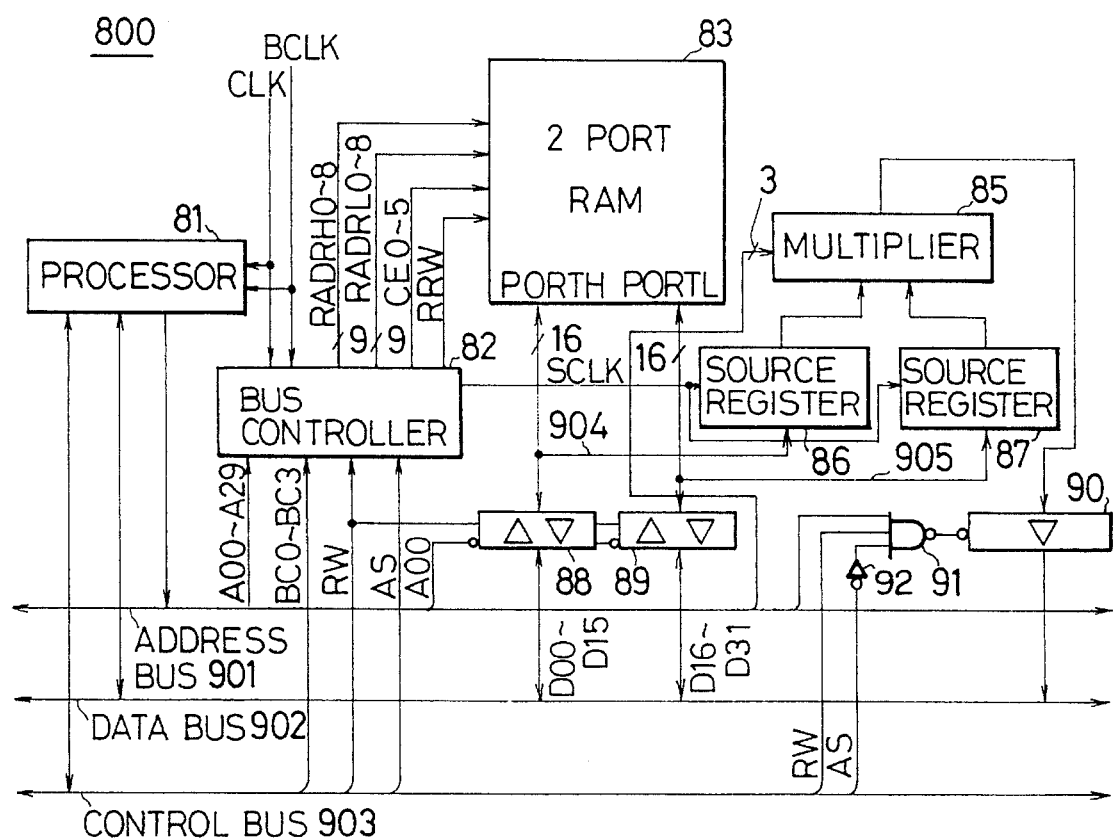
FIG. 22 is a configuration drawing of a circuit for a processor system which is a fourth embodiment of the present invention.
FIG. 23 is an address format used in the system of the fourth embodiment of the present invention shown in FIG. 22.

Next, a fourth embodiment of the present invention illustrated in FIG. 22 will be explained. In the third embodiment, one piece of source data must be stored in the higher RAM 33 and a second piece of source data in the lower RAM 34.

Accordingly, it is necessary to extract the multiplication data from the two RAMs 33, 34.

For example, with the system of the third embodiment it is not possible to simultaneously extract two pieces of multiplication data stored in the higher RAM 33 and provide this data to the multiplier 35.

In the fourth embodiment, however, this restriction is eliminated by providing the RAM as a two-port RAM.

The processor system 800 of the fourth embodiment comprises a processor 81, a bus controller 82, a two-port RAM 83, a multiplier 85, a source register 86, a source register 87, a plurality of buffers 88, 89, 90, and a pair of gates 91, 92.

With the exception of the bus controller 82 and the two-port RAM 83, the structural elements are identical to those of the system 700 of the third embodiment.

The bus controller 82 is a circuit for controlling access to the two-port RAM 83 and the write-in of data to the source register 86 and the source register 87. The bus controller 82 inputs address signals A00 to A29, byte control signals BC0 to BC3, a read/write signal RW, and an AS signal output by the processor 81 to the bus controller 82 via an address bus 901 and a control bus 903.

Address signals RADRH0 to RADRH8 and enable sigport RAM 83, together with a read/write signal RRW. In addition, a signal SCLK indicating the timing of the data latching of the source register 86 and the source register 87 of the multiplier 85 is output.

In the same manner as in the operation of the processor system 700 shown in the third embodiment, access to the RAM occurs during a bus cycle in which the signals A00 to A28 are all "0".

At this time, the bus controller 82 outputs RADRH0=0, RADRH1 to RADRH8=A22 to A29, RADRL0=1, RADRL1 to RADRL8=A22 to A29. The multiplication operation takes place when A00=1 and, A04 to A11=0 A12 to A20=RADRH0 to RADRH8 and A21 to A29=RADRL0 to RADRL8. The address format used at this time is illustrated in FIG. 23.

The two-port RAM 83 is a memory for storing data and programs. The high order port PORTH is connected to the data buses D00 to D15 through the buffer 88. The lower port PORTL is connected to the data buses D16 to D31 through the buffer 89. An optional two words within the two-port RAM can be accessed simultaneously by means of the address signals RADRH0 to RADRHS, RADRL0 to RADRL8. The address is made up of nine bit width in the fourth embodiment, therefore the two-port RAM is one kilobyte (KB) in size.

By using a two-port RAM as the RAM structure, the processor system 800 illustrated by this fourth embodiment of the present invention can simultaneously read an optional two words of data and can use these two words as the source data for the multiplier.

The details of the present invention are not limited to the embodiments described above. For example, it is possible to use a RAM of 32-bit width in the same manner.

In addition, the fourth embodiment describes the multiplier of 16 bit width input and 32 bit width output, but the present invention is in no way restricted to this. An input of 32 bits to the multiplier and an output of 32 bits, or the like, is also possible. In the above-described third and fourth embodiments, the processor systems 800 were described in which the size of the RAM is a total of one kilobyte, but the present invention is in no way restricted to this.

It is also possible to use a RAM of a 512-byte size or a two-kilobyte size. The above-mentioned embodiments have also been described for the case where a RAM is used as the memory, but the present: invention is not limited to such a case.

The effect of the third and fourth embodiment of the present invention can also be obtained in the same manner if a ROM is used in place of the RAM.

In addition, the third and the fourth embodiments were explained with a multiplier as an example, but it is, of course, possible to apply a method whereby data is input from an external source to a normal arithmetic circuit which outputs the result are included in the scope of the claims of the present invention.

For example, a floating-point arithmetic circuit can be applied in the method of the third and the fourth embodiments of the present invention.

The processor systems 700 and 800 of the third and the fourth embodiments was explained above for the case in which two items of source data were input simultaneously to the arithmetic element. However, the present invention is not limited to this. One item of source data, or three or more items may also be input simultaneously to the arithmetic element.

<Fifth embodiment>

Next, a fifth embodiment of the present invention will now be described referring with Figs.9 and 10.

Figure 24:
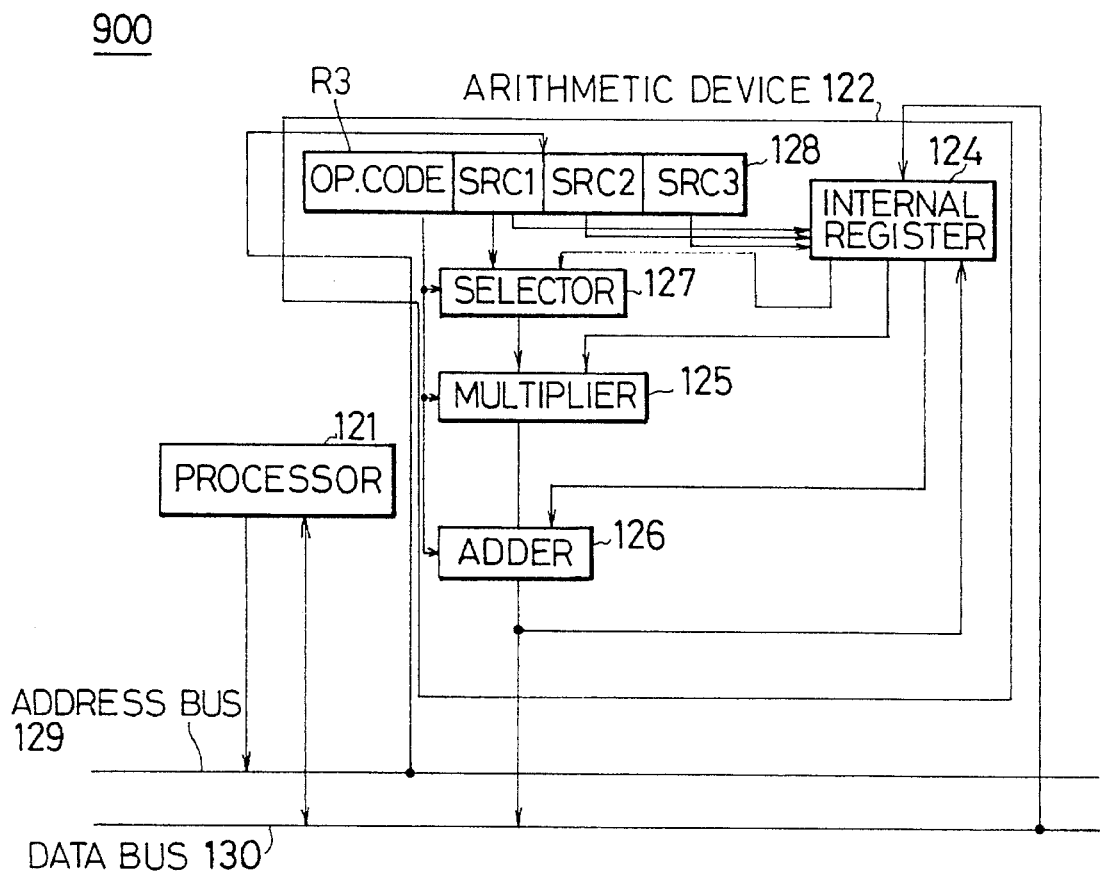
FIG. 24 is a configuration drawing of a circuit for a fifth embodiment of a processor system of the present invention.

FIG. 24 shows a configuration of a processor system 900 according: to the fifth embodiment. The processor system 900 is an example of a three-input processor system. An arithmetic device 122 comprises an instruction register 128, an internal register 124, a multiplier 125, an adder 126, and a selector 127. The multiplier 125 and the adder 126 contain 16 bits respectively.

Figure 25:
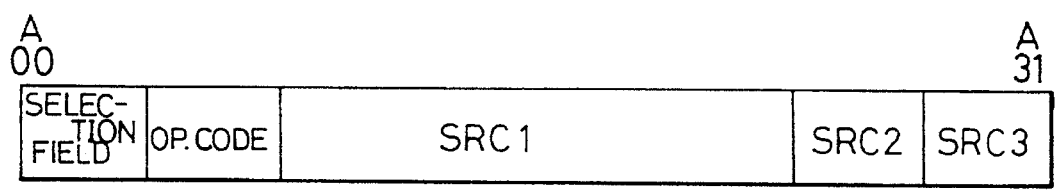
FIG. 25 is a drawing showing the structure of an address used by a arithmetic device of the fifth embodiment of the processor system of the present invention shown in FIG. 24.

FIG. 25 shows the structure of an address. This address is divided into five fields. The highest order field is a selection field, which is the field which specifies the arithmetic device 122.

Next is an operand field which specifies the operation of the arithmetic device 122. SRC1, SRC2, and SRC3 are fields for specifying the operand addresses. SRC2 and SRC3 specify the address of the internal register 124. SRC1 can specify an internal address or a 16-bit immediate data unit source of the input is set by the operand. The selector 127 inputs the value in the internal register 124 or the immediate value to the multiplier 125 from those settings. The multiplication result is also input to the adder 126.

An additional operand for the adder 126 is input from the internal register 124 specified by the field SRC3. The computation results from the adder 126 can be stored in the internal register 124. These results can also be output directly to the data bus 130.

Accordingly, in the prior art, only after loading the three operand to the internal registers 124, the multiplication process can be executed. However, by means of the present invention, data input and the reading-out of the computation result can be executed within the same bus cycle because it is possible to input the immediate data from the address bus. Accordingly, the computation can be executed in a short time.

Moreover, because it is possible with the present invention to simultaneously provide a plurality of items of arithmetic element source data from memory to the arithmetic element, a data transmission head can be eliminated. For example, in the case where a multiplier which can multiply in a minimum of two clock cycles by the present invention. Further, multiplication is performed in the present invention with one read operation, therefore multiplication is possible with one data transmission instruction.

In the conventional example, it is necessary to execute two write bus cycles and one read bus cycle, therefore three instructions are necessary. When four clock cycles are used to execute an instruction to perform a read operation, and two clock cycles are used to execute an instruction which executes a write bus cycle, it is possible with the present invention to execute in four clock cycles a multiplication which would require eight clock cycles in a conventional system. In this manner it is possible to process a multiplication in the system of the present invention.

Scaler product operations occur with high frequency in signal processing and the like, therefore, the processing system of the present invention demonstrates high performance in this type of application.

What is claimed is:

1. A processor system comprising:

a processor for outputting an instruction including a first data to be used for an arithmetic operation;

memory means for storing at least two second data items to be used for the arithmetic operation, and for outputting the second data items based on the instruction;

arithmetic means for executing the arithmetic operation between the second data items stored in the memory means or between one of the second data items received during a bus cycle and the first data received during the bus cycle;

an address bus and a data bus for connecting the processor, the memory means, and the arithmetic means;

an exclusive bus for connecting between the memory means and the arithmetic means to transfer the second data items between the arithmetic means and the memory means, wherein the arithmetic means is capable of executing the arithmetic operation between the second data items or between the first data and the one of the second data items, and transmitting the arithmetic result to the data bus under the control of the instruction;

a first buffer circuit incorporated between the arithmetic means and the data bus, wherein the first buffer circuit is capable of selecting whether the arithmetic result of the arithmetic means is transmitted to the data bus based on the instruction; and a second buffer circuit incorporated between the memory means and the data bus, wherein the second buffer circuit is capable of selecting whether the second data items in the memory means are transmitted to the data bus based on the instruction, and wherein while one of the first and second buffer circuits is transmitting data to the data bus, the other buffer circuit does not output data to the data bus.

2. A processor system comprising:

a processor for outputting an instruction to be used for an arithmetic operation;

memory means for storing second data items to be used for the arithmetic operation;

control means for controlling input/output operation of the memory means under the control of the instruction from the processor;

arithmetic means for executing the arithmetic operation between the second data items received during a bus cycle based on the control of the control means;

an address bus and a data bus for connecting the processor, the memory means, the control means, and the arithmetic means;

an exclusive bus for connecting between the memory means and the arithmetic means to transfer the second data items between the memory means and the arithmetic means, wherein the instruction is transferred from the processor to the control means through the address bus during the bus cycle, the arithmetic result of the arithmetic means is transferred through the data bus, and wherein the arithmetic means is capable of executing the arithmetic operation between the second data items;

a first buffer circuit incorporated between the arithmetic means and the data bus, wherein the first buffer circuit is capable of selecting whether the arithmetic result of the arithmetic means is transmitted to the data bus under the control of the control means; and a second buffer circuit incorporated between the memory means and the data bus, wherein the second buffer circuit is capable of selecting whether the second data items are transferred to the data bus based on the instruction, and while one of the first and second buffer circuits is transmitting data to the data bus, the other buffer circuit does not output data to the data bus.

* * * * *